(12) United States Patent
Matsubara

(10) Patent No.: US 7,377,175 B2
(45) Date of Patent: May 27, 2008

(54) SENSOR HAVING A DIAPHRAGM

(75) Inventor: Naoteru Matsubara, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/511,261

(22) Filed: Aug. 29, 2006

(65) Prior Publication Data
US 2007/0056377 A1 Mar. 15, 2007

(30) Foreign Application Priority Data
Aug. 29, 2005 (JP) ............................ 2005-246929
Mar. 15, 2006 (JP) ............................ 2006-071671

(51) Int. Cl.
G01L 7/08 (2006.01)

(52) U.S. Cl. ............................. 73/715; 73/703; 73/754

(58) Field of Classification Search .......... 73/700–756; 361/283.1–283.4; 181/132, 144–164
See application file for complete search history.

(56) References Cited

U.S. PATENT DOCUMENTS 4,523,474 A * 6/1985 Browne et al. ............... 73/724
5,094,109 A * 3/1992 Dean et al. ................... 73/718
5,146,435 A 9/1992 Bernstein
5,942,693 A * 8/1999 Harms et al. ................. 73/730
6,450,025 B1 * 9/2002 Wado et al. ............. 73/204.26
6,598,483 B2 * 7/2003 Miyashita et al. ............ 73/718
7,082,834 B2 * 8/2006 Petrova et al. ................ 73/708
7,181,975 B1 * 2/2007 Bradley et al. ............... 73/724

FOREIGN PATENT DOCUMENTS

JP 60-500841 A 5/1985
WO WO 84/03410 8/1984

* cited by examiner

Primary Examiner—Andre J. Allen
Assistant Examiner—Jermaine Jenkins
(74) Attorney, Agent, or Firm—McDermott Will & Emery LLP

(57) ABSTRACT

A sensor hard to break and capable of improving sensitivity is obtained. This sensor comprises an electrode plate and a diaphragm, opposed to the electrode plate, including a first elastic film arranged on a central portion and a second elastic film, arranged at least on a peripheral portion of the first elastic film, made of a material having a lower elastic modulus than the first elastic film.

20 Claims, 23 Drawing Sheets

SENSOR HAVING A DIAPHRAGM

BACKGROUND OF THE INVENTION

1. Field of the Invention

The present invention relates to a sensor, and more particularly, it relates to a sensor having a diaphragm.

2. Description of the Background Art

A sensor such as a sonic sensor having a diaphragm is known in general, as disclosed in Japanese Patent Laying-Open No. 60-500841 (1985), for example.

The sonic sensor proposed in the aforementioned Japanese Patent Laying-Open No. 60-500841 comprises a vibratory diaphragm formed by a silicon film having a small thickness and a fixed electrode plate of a metal opposed to the diaphragm. When the diaphragm vibrates by a sound pressure in this sonic sensor, the distance between the diaphragm and the fixed electrode plate changes due to this vibration. Thus, the electrostatic capacitances of capacitors formed by the diaphragm and the fixed electrode so change that the sonic sensor converts sounds to electric signals by outputting changes in the quantities of charges in the diaphragm and the fixed electrode plate resulting from the changes of the electrostatic capacitances as the electric signals.

Assuming that $\epsilon$ represents the dielectric constant between the diaphragm and the fixed electrode plate when the diaphragm and the fixed electrode plate have the same surface areas S, electrostatic capacitances $C_1$ and $C_2$ of two capacitors at different distances $d_1$ and $d_2$ ($d_1 > d_2$) between the diaphragm and the fixed electrode plate can be expressed as follows:

$$C_1 = \epsilon S / d_1 \quad (1)$$

$$C_2 = \epsilon S / d_2 \quad (2)$$

When the average distances between the diaphragm and the fixed electrode plate are sonically reduced by an average displacement $\delta d$ in the respective capacitors, electrostatic capacitances $C_{1a}$ and $C_{2a}$ of the capacitors can be expressed as follows:

$$C_{1a} = \epsilon S / (d_1 - \delta d) \quad (3)$$

$$C_{2a} = \epsilon S / (d_2 - \delta d) \quad (4)$$

Therefore, the displacements $\delta C_1$ and $\delta C_2$ of the capacitors can be expressed as follows:

$$\delta C_1 = C_1 - C_{1a} = \epsilon S \delta d / d_1 (d_1 - \delta d) \quad (5)$$

$$\delta C_2 = C_2 - C_{2a} = \epsilon S \delta d / d_2 (d_2 - \delta d) \quad (6)$$

$d_1 > d_2$ from the assumption, and hence $\delta C_1 < \delta C_2$.

As understood from the expressions (5) and (6), therefore, the change $\delta C_2$ of the electrostatic capacitance in the capacitor having the smaller distance ($d_2$) between the diaphragm and the fixed electrode plate exceeds the change $\delta C_1$ of the other capacitor when the distances between the diaphragm and the fixed electrode plate are reduced by the same value $\delta d$ in these capacitors. Consequently, the electric signal output on the basis of the capacitor having the smaller distance ($d_2$) between the diaphragm and the fixed electrode plate more largely changes, thereby improving sensitivity of the sonic sensor.

In the sonic sensor according to the aforementioned Japanese Patent Laying-Open No. 60-500841, however, the diaphragm formed by the silicon film, wholly made of the same material (silicon) with the same thickness, entirely exhibits the same elastic modulus. The outer periphery and the central portion of the diaphragm entirely having the same elastic modulus are substantially uniformly bent in a convex manner due to vibration resulting from a sound pressure, to increase the displacement (quantity of bending) of the central portion toward the fixed electrode plate. Therefore, it is difficult to reduce the distances between the diaphragm and the fixed electrode plate. In the sonic sensor according to the aforementioned Japanese Patent Laying-Open No. 60-500841, therefore, it is disadvantageously difficult to improve the sensitivity.

In this regard, U.S. Pat. No. 5,146,435, for example, proposes a sonic sensor reducing the displacement (quantity of bending) of a central portion of a diaphragm by suppressing bending of the central portion. The sonic sensor proposed in the aforementioned U.S. Pat. No. 5,146,435 comprises the diaphragm formed by a silicon film, a spring film of silicon integrally provided on part of the outer periphery of the diaphragm and a fixed electrode plate opposed to the diaphragm. In this sonic sensor, the spring film of silicon has a smaller thickness than the diaphragm of silicon, to be easily sonically vibrated (bent). On the other hand, the diaphragm having a larger thickness than the spring film is hard to bend. When the sonic sensor according to the aforementioned U.S. Pat. No. 5,146,435 receives a sound, therefore, the spring film is vibrated (bent) by a sound pressure. Following this vibration of the spring film, the diaphragm is vibrated along with the spring film without much bending. Therefore, the distance between the diaphragm and the fixed electrode plate, which may be set only in consideration of vibration (bending) of the spring film, can be set to a small level. Consequently, sensitivity can be improved in the sonic sensor according to the aforementioned U.S. Pat. No. 5,146,435.

In the sonic sensor disclosed in the aforementioned U.S. Pat. No. 5,146,435, however, the spring film, formed with the thickness smaller than that of the diaphragm to be easily vibrated, is disadvantageously easy to break.

SUMMARY OF THE INVENTION

The present invention has been proposed in order to solve the aforementioned problems, and an object of the present invention is to provide a sensor hard to break and capable of improving sensitivity.

A sensor according to an aspect of the present invention comprises an electrode plate and a diaphragm, opposed to the electrode plate, including a first elastic film arranged on a central portion and a second elastic film, arranged at least on a peripheral portion of the first elastic film, made of a material having a lower elastic modulus than the first elastic film.

The sensor according to this aspect of the present invention is so provided with the diaphragm including the first elastic film and the second elastic film of the material having a lower elastic modulus than the first elastic film that the second elastic film arranged on the peripheral portion of the first elastic film can so vibrate as to vibrate the first elastic film while the first elastic film having a higher elastic modulus than the second elastic film can be inhibited from bending as compared with the second elastic film. Thus, the slightly bent first elastic film can be inhibited from coming into contact with the electrode plate upon remarkable vibration of the second elastic film, whereby the distance between the first elastic film and the electrode plate can be reduced. Consequently, sensitivity of the sensor can be improved. Further, the diaphragm is constituted of the first and second elastic films having different elastic moduli so that the second elastic film may not be reduced in thickness or width to have a low elastic modulus, whereby the second elastic film can be inhibited from reduction of mechanical strength. Thus, the sensitivity of the sensor can be improved, and the diaphragm including the second elastic film can be inhibited from breakage.

In the sensor according to the aforementioned aspect, the second elastic film is preferably partially so modified as to reduce residual stress. According to this structure, the second elastic film having reduced residual stress more vibrates so that the sensitivity of the sensor can be more improved.

In the aforementioned sensor having the modified second elastic film, the second elastic film is preferably so modified as to substantially eliminate residual stress. According to this structure, the second elastic film further vibrates so that the sensitivity of the sensor can be further improved.

In the aforementioned sensor having the modified second elastic film, the second elastic film is preferably modified by ion implantation. According to this structure, modification of the second elastic film in the depth direction can be precisely controlled.

In the aforementioned sensor having the modified second elastic film, the second elastic film preferably includes an unmodified layer and a modified layer formed on the unmodified layer. According to this structure, the residual stress in the second elastic film can be easily reduced through the unmodified and modified layers.

In the aforementioned sensor having the second elastic film including the unmodified layer and the modified layer, the unmodified layer of the second elastic film preferably has tensile stress, and the modified layer of the second elastic film preferably has compressive stress. According to this structure, the residual stress in the second elastic film can be easily substantially eliminated by adjusting the tensile stress of the unmodified layer and the compressive stress of the modified layer.

In this case, the unmodified layer and the modified layer constituting the second elastic film may include SiOC layers.

In the sensor according to the aforementioned aspect, the second elastic film is preferably so formed as to enclose the outer periphery of the first elastic film. According to this structure, strength of the second elastic film can be further improved.

In the sensor according to the aforementioned aspect, the second elastic film and the first elastic film are preferably stacked with each other. According to this structure, the second elastic film may not be patterned by etching or the like, whereby manufacturing steps for the sensor can be simplified.

The sensor according to the aforementioned aspect preferably further comprises a substrate having an opening, and the diaphragm is preferably set on a region corresponding to the opening of the substrate. According to this structure, a sound or a pressure is transmitted to the diaphragm through the opening, whereby the diaphragm can be easily vibrated in response to the sound or the pressure.

In the sensor according to the aforementioned aspect, the first elastic film may be conductive.

In this case, the sensor preferably further comprises a first connecting wire portion integrally formed on the first elastic film to extend outward from the diaphragm. According to this structure, the first connecting wire portion may not be provided independently of the first elastic film, whereby the structure of the sensor can be simplified.

The aforementioned sensor comprising the first connecting wire portion preferably further comprises a first electrode electrically connected to the first connecting wire portion on the outside of the diaphragm. According to this structure, a voltage can be easily applied to the first elastic film through the first electrode.

The sensor according to the aforementioned aspect preferably further comprises a second connecting wire portion integrally formed on the electrode plate to extend toward a region corresponding to the outside of the diaphragm. According to this structure, the second connecting wire portion may not be provided independently of the electrode plate, whereby the structure of the sensor can be simplified.

In this case, the sensor preferably further comprises a second electrode electrically connected to the second connecting wire portion on the region corresponding to the outside of the diaphragm. According to this structure, the voltage can be easily applied to the electrode plate through the second electrode.

The sensor according to the aforementioned aspect may be a sonic sensor, and a plurality of holes may be provided on a region of the electrode plate opposite to the diaphragm. In this case, the sensor further comprises a protective film so formed as to cover the electrode plate and the inner surfaces of the holes, while a plurality of sonic holes are provided on regions of the protective film corresponding to the holes of the electrode plate. According to this structure, the electrode plate can be reinforced with the protective film, while the sound can be passed toward the diaphragm through the sonic holes of the protective film.

The sensor according to the aforementioned aspect is preferably a pressure sensor further comprising a first substrate having an opening so that the diaphragm is set on a region corresponding to the opening and a second substrate opposed to the first substrate so that the electrode plate is set thereon. According to this structure, the pressure can be transmitted to the diaphragm through the opening of the first substrate, whereby the diaphragm can be easily vibrated in response to the pressure.

In the aforementioned sensor comprising the first and second substrates, the first substrate preferably includes a recess portion constituting a sensor gap of the pressure sensor. According to this structure, the pressure can be easily detected in the recess portion.

In the aforementioned sensor comprising the first and second substrates, the first substrate may be a semiconductor substrate, and the second substrate may be a glass substrate.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to the drawings.

First Embodiment

First, the structure of a microphone 30 according to a first embodiment of the present invention is described with reference to FIGS. 1 to 4. According to the first embodiment, the present invention is applied to the microphone (sonic sensor) 30, which is an exemplary sensor.

Figure 1:
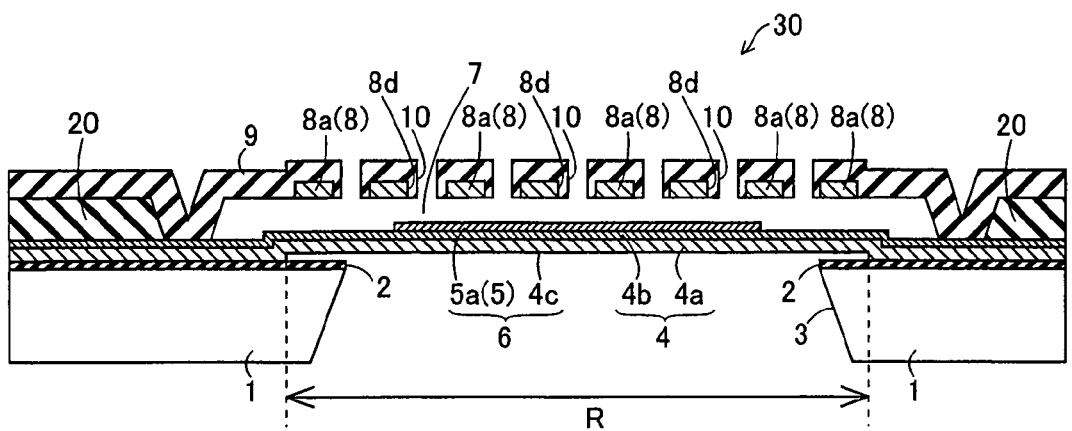
FIGS. 1 and 2 are sectional views showing the structure of a microphone according to a first embodiment of the present invention.
Figure 2:
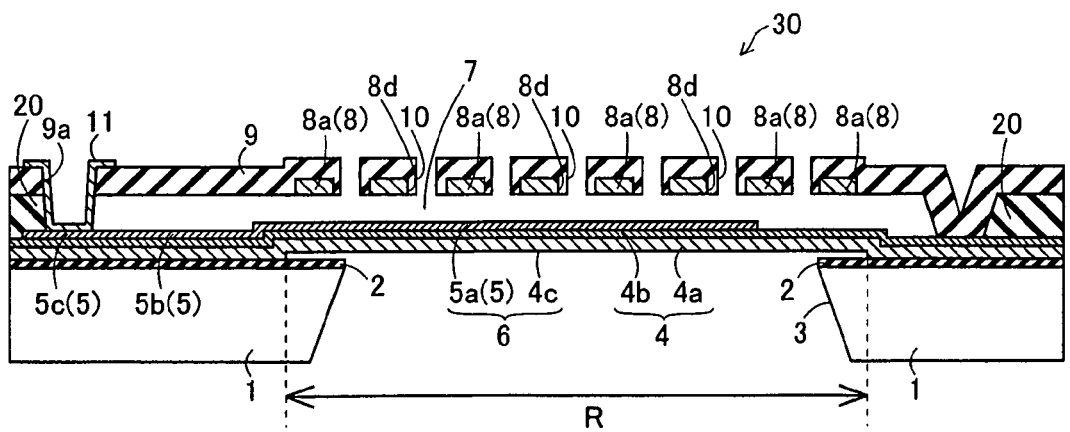

In the microphone 30 according to the first embodiment, an etching stopper film 2 of SiN is formed on the surface of a silicon substrate 1, as shown in FIGS. 1 and 2. This etching stopper film 2 has a thickness of about 0.05 μm to about 0.2 μm. A partially square-pyramidal (truncated square-pyramidal) (see FIGS. 1 and 3) opening 3 is provided in a region for forming a diaphragm 6 described later, to pass through the silicon substrate 1 and the etching stopper film 2. This opening 3 functions as an air passage when the microphone 30 receives a sound.

An SiOC layer 4 having a thickness of about 1.125 μm formed on the overall upper surfaces of the etching stopper film 2 and the opening 3. This SiOC layer 4 has a low elastic modulus of about 6.8 GPa. The SiOC layer 4 consists of a lower unmodified SiOC layer 4a having a thickness of about 1.0 μm and an upper modified SiOC layer 4b, having a thickness of about 0.125 μm, modified by ion implantation described later. The unmodified SiOC layer 4a has residual stress (tensile stress) of 50 MPa. In the modified SiOC layer 4b, on the other hand, the residual stress is modified from the tensile stress of 50 MPa to compressive stress of 400 MPa. Assuming that the compressive stress is negative while $\delta St_{SiOC1}$ (=50 MPa) represents the residual stress in the unmodified SiOC layer 4a, $t_{SiOC1}$ (=1 μm) represents the thickness of the unmodified SiOC layer 4a, $\delta St_{SiOC2}$ (=−400 MPa) represents the residual stress in the modified SiOC layer 4b and $t_{SiOC2}$ (=0.125 μm) represents the thickness of the modified SiOC layer 4b, the residual stress δSt in the overall SiOC layer 4 can be expressed as follows:

$$\delta St = (\delta St_{SiOC1} \cdot t_{SiOC1} + \delta St_{SiOC2} \cdot t_{SiOC2})/(t_{SiOC1} + t_{SiOC2}) \quad (7)$$

When $\delta St_{SiOC1}$=50 MPa, $t_{SiOC1}$=1 μm, $\delta St_{SiOC2}$=−400 MPa and $t_{SiOC2}$=0.125 μm are substituted in the above expression (7), the residual stress in the overall SiOC layer 4 is 0 Pa (δSt=0). A discoidal vibrating portion 4c (see FIGS. 3 and 4) is formed on a portion of the SiOC layer 4 located above the opening 3 and the outer periphery thereof. The vibrating portion 4c is an example of the "second elastic film" in the present invention.

Figure 3:
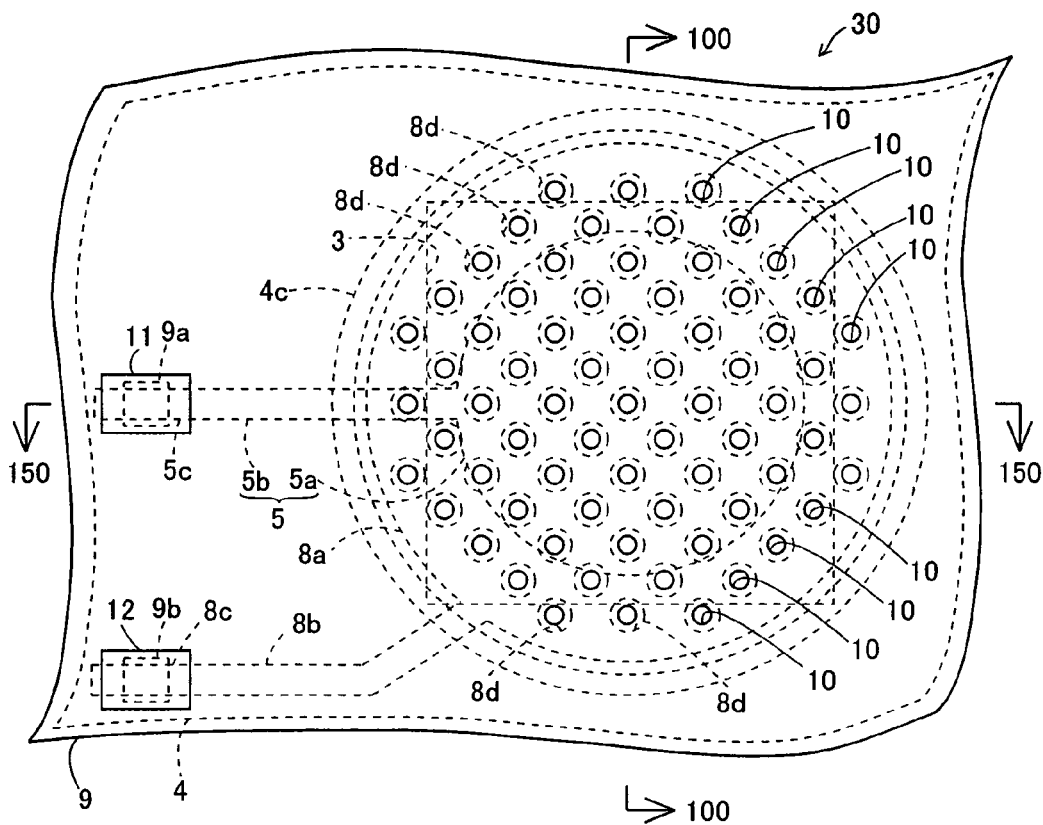
FIGS. 3 and 4 are plan views of the microphone according to the first embodiment shown in FIG. 1.
Figure 4:
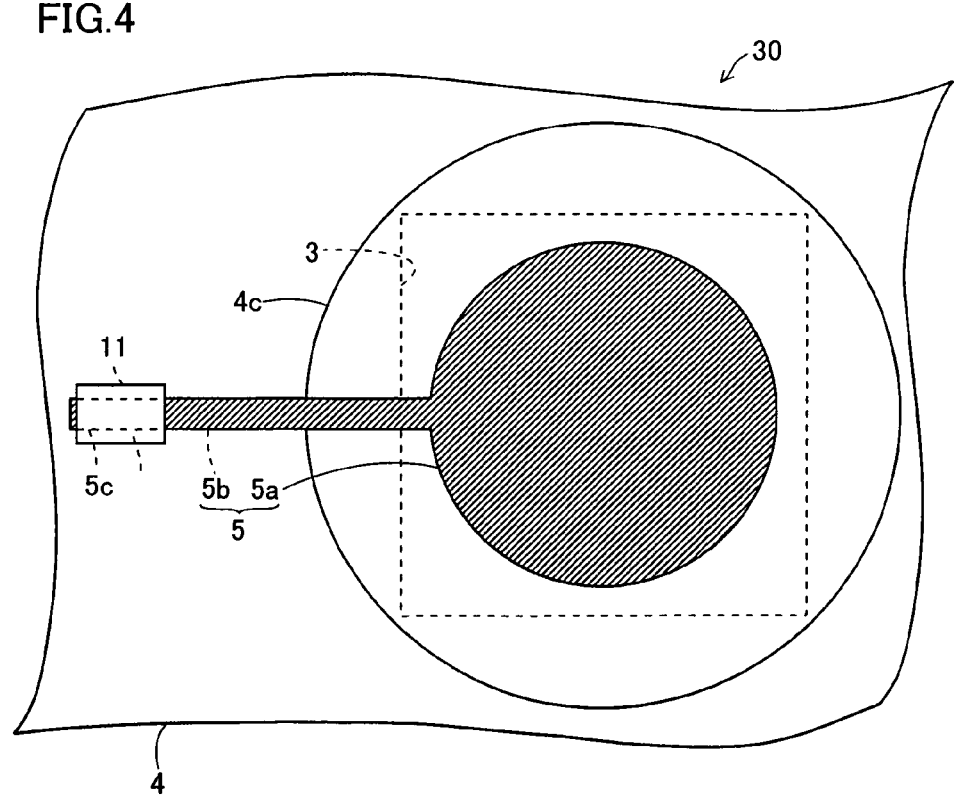

A polysilicon layer 5 having an elastic modulus (about 160 GPa to about 190 GPa) higher than the elastic modulus (about 6.8 GPa) of the SiOC layer 4 with a thickness of about 0.5 μm to about 1 μm is formed on part of the vibrating portion 4c of the SiOC layer 4. This polysilicon layer 5, doped with an n-type impurity (phosphorus (P)), is conductive. As shown in FIGS. 3 and 4, the polysilicon layer 5 includes a discoidal vibrating portion 5a concentric with the vibrating portion 4c in plan view and a connecting wire portion 5b, extending from the vibrating portion 5a, including a contact region 5c. The vibrating portion 5a has a radius of about 250 μm. The vibrating portion 4c of the SiOC layer 4 located above the opening 3 and the vibrating portion 5a of the polysilicon layer 5 constitute the diaphragm 6. The diaphragm 6 (vibrating portion 4c) has a thickness R of about 400 μm. In other words, the vibrating portion 5a of the polysilicon layer 5 having the radius of about 250 μm is arranged on the center of the diaphragm 6 having the radius of about 400 μm, and the vibrating portion 4c of the SiOC layer 4 having the radius of about 400 μm is arranged along the overall diaphragm 6. An air gap 7 is formed above the diaphragm 6. The vibrating portion 5a is an example of the "first elastic film" in the present invention.

As shown in FIGS. 1 and 2, another polysilicon layer 8 includes an electrode plate portion 8a opposed to the diaphragm 6 through the air gap 6 and a connecting wire portion 8b, extending from the electrode plate portion 8a, including a contact region 8c (see FIG. 3). This polysilicon layer 8, doped with the n-type impurity (phosphorus (P)), is conductive. The polysilicon layer 8 has a thickness of about 1 μn. The distance between the vibrating portion 5a of the polysilicon layer 5 and the electrode plate portion 8a of the polysilicon layer 8, insulated from each other by the air gap 7, is about 2 μm to about 5 μm. The electrode plate portion 8a is formed with holes 8d, larger in radius than sonic holes 10 described later, on positions corresponding to the sonic holes 10. The electrode plate portion 8a is an example of the "electrode plate" in the present invention.

A protective film 9 is so formed as to cover the SiOC layer 4 and the polysilicon layer 8. This protective film 9 of SiN has a thickness of about 1 μm. The protective film 9 is formed with the plurality of columnar sonic holes 10 linked to the air gap 7 from outside. The sonic holes 10 function as air passages when the microphone 30 receives a sound. The protective film 9 is formed with contact holes 9a and 9b. A sacrifice layer 20 of PSG (phosphorus-added SiO$_2$) is formed between the protective film 9 and the SiOC and polysilicon layers 4 and 5 on a portion closer to the outer periphery of the air gap 7.

Electrodes 11 and 12 of gold (Al) and chromium (Cr) having thicknesses of about 500 nm and about 100 nm respectively are formed on the contact regions 5c and 8c of the connecting wire portions 5b and 8b of the polysilicon layers 5 and 8 through the contact holes 9a and 9b of the protective film 9 respectively.

Operations of the microphone 30 according to the first embodiment are now described with reference to FIGS. 1 and 5. It is assumed that a constant voltage is applied between the vibrating portion 5a and the electrode plate portion 8a through the electrodes 11 and 12.

When the microphone 30 receives no sound, the diaphragm 6 remains unvibrational, as shown in FIG. 1. Therefore, the electrostatic capacitance between the vibrating portion 5a and the electrode plate portion 8a remains unchanged, so that no charges flow from (into) the vibrating portion 5a and the electrode plate portion 8a.

Figure 5:
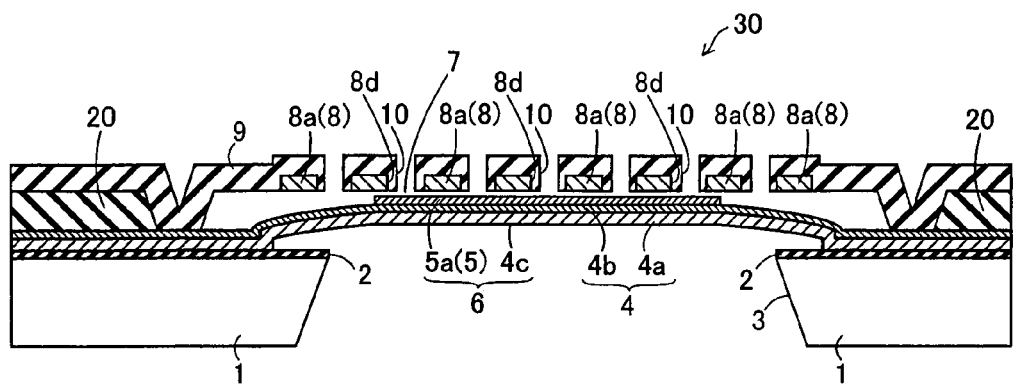
FIG. 5 is a sectional view for illustrating the operating principle of the microphone according to the first embodiment shown in FIG. 1.

When the microphone 30 receives a sound, on the other hand, the diaphragm 6 vibrates as shown in FIG. 5. Therefore, the electrostatic capacitance between the vibrating portion 5a and the electrode plate portion 8a so changes that charges flow from (into) the vibrating portion 5a and the electrode plate portion 8a. The microphone 30 outputs the charges flowing from (into) the vibrating portion 5a and the electrode plate portion 8a as an electric signal corresponding to the received sound.

Figure 6:
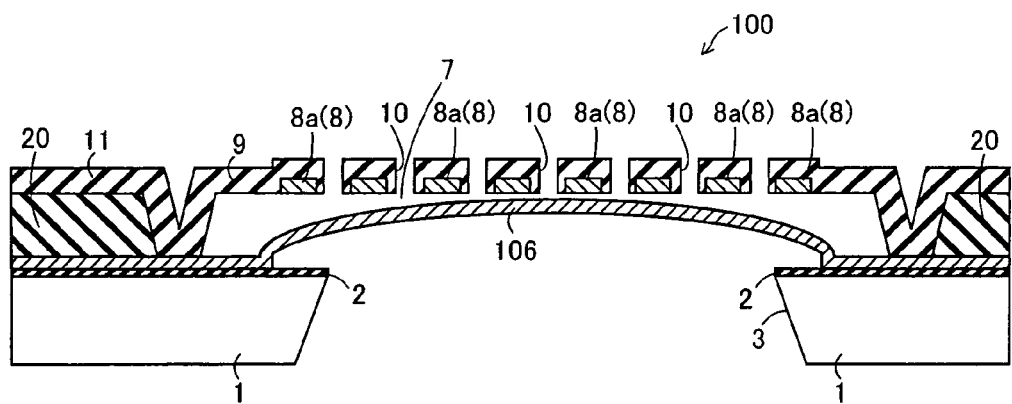
FIG. 6 is a sectional view showing a state vibrating a diaphragm of a microphone according to comparative example 1.

The case of vibrating the diaphragm 6 formed by the polysilicon layer 5 and the SiOC layer 4 stacked with each other in the microphone 30 according to the first embodiment and a case of vibrating a diaphragm 106 formed by a single layer of a material having a low elastic modulus in a microphone 100 according to comparative example 1 are now compared with each other. FIG. 6 is a sectional view showing the state vibrating the diaphragm 106 of the microphone 100 according to comparative example 1. The microphone 100 according to comparative example 1 is similar in structure to the microphone 30 according to the first embodiment, except that the diaphragm 106 is formed by the single layer of the material having a low elastic modulus.

As shown in FIG. 6, the diaphragm 106 is constituted of only the material having a low elastic modulus in the microphone 100 according to comparative example 1. When the diaphragm 106 is sonically vibrated, therefore, not only a peripheral portion but also a central portion of the diaphragm 106 is bent toward an electrode plate portion 8a. In the microphone 100 according to comparative example 1, therefore, the distance between the diaphragm 106 and the electrode plate portion 8a must be increased, in order to prevent the diaphragm 106 and the electrode plate portion 8a from coming into contact with each other.

In the microphone 30 according to the first embodiment, on the other hand, the peripheral portion of the diaphragm 6 is constituted of the vibrating portion 4c of SiOC having a low elastic modulus while the central portion of the diaphragm 6 is constituted of the vibrating portion 4c of SiOC having a low elastic modulus and the vibrating portion 5a of polysilicon having a high elastic modulus stacked with each other, so that the central portion and the peripheral portion of the diaphragm 6 have high and low elastic moduli respectively. When the diaphragm 6 vibrates, therefore, only the part of the vibrating portion 4c located on the outer periphery of the vibrating portion 5a is deformed while the vibrating portion 5a arranged on the center and the central portion of the vibrating portion 4c are hardly deformed and maintain flat states, as shown in FIG. 5. In the microphone 30 according to the first embodiment, therefore, the distance between the diaphragm 6 and the electrode plate portion 8a may not be so increased as that in the microphone 100 according to comparative example 1, in order to prevent the diaphragm 6 (vibrating portion 5a) and the electrode plate portion 8a from coming into contact with each other.

According to the first embodiment, as hereinabove described, the microphone 30 is provided with the diaphragm 6 including the vibrating portion 5a of polysilicon (elastic modulus: about 160 GPa to about 190 GPa) and the vibrating portion 4c of SiOC (elastic modulus: about 6.8 GPa) having the lower elastic modulus than polysilicon so that the vibrating portion 4c arranged on the peripheral portion of the vibrating portion 5a can vibrate to vibrate the vibrating portion 5a and the vibrating portion 5a having the higher elastic modulus than the vibrating portion 4c can be inhibited from bending as compared with the vibrating portion 4c. Thus, the slightly bent vibrating portion 5a can be inhibited from coming into contact with the electrode plate portion 8a upon remarkable vibration of the vibrating portion 4c, whereby the distance between the vibrating portion 5a and the electrode plate portion 8a can be reduced. Consequently, sensitivity of the microphone 30 can be improved. Further, the diaphragm 6 is constituted of the vibrating portion 5a of polysilicon having the higher elastic modulus (about 160 GPa to about 190 GPa) and the vibrating portion 4c of SiOC having the lower elastic modulus (about 6.8 GPa) so that the vibrating portion 4c may not be reduced in thickness or width in order to have a low elastic modulus, whereby the vibrating portion 4c can be inhibited from reduction of mechanical strength. Thus, the sensitivity of the microphone 30 can be improved, and the diaphragm 6 including the vibrating portion 4c can be inhibited from breakage.

According to the first embodiment, the SiOC layer 4 including the vibrating portion 4c is so modified that the residual stress in the vibrating portion 4c is 0 Pa, whereby the vibrating portion 4c having no residual stress can more largely vibrate to further improve the sensitivity of the microphone 30. Further, the SiOC layer 4 is so modified by ion implantation that the depth of the modification can be precisely controlled. In addition, the vibrating portion 4c, arranged to enclose the outer periphery of the vibrating portion 5a while covering the lower surface thereof, can be further improved in strength. Further, the SiOC layer 4 is not patterned, whereby a manufacturing process for the microphone 30 described later can be simplified by omitting an etching step etc.

Figure 7:
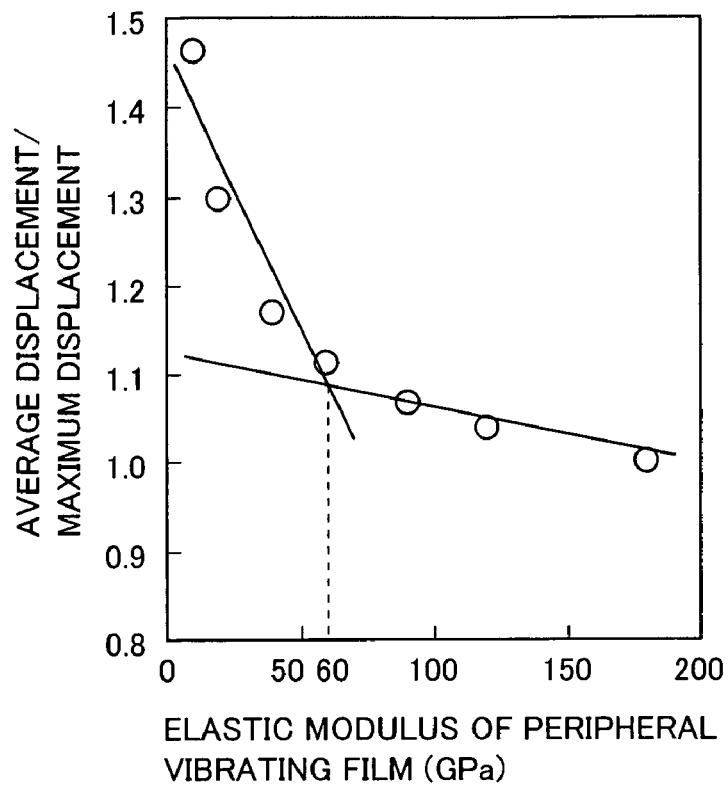
FIG. 7 is a graph showing the relation between the elastic modulus of a peripheral vibrating film constituting a diaphragm and a value obtained by dividing an average displacement of the diaphragm by the maximum displacement (displacement of a central portion) of the diaphragm obtained by a simulation.

Simulations performed for confirming effects of the aforementioned first embodiment are now described. FIG. 7 is a graph showing the relation between the elastic modulus of a peripheral vibrating film (vibrating portion 4c) constituting a diaphragm and a value obtained by dividing an average displacement of the diaphragm by the maximum displacement (displacement of a central portion) of the diaphragm. In this simulation, the elastic modulus of a central high elasticity film (vibrating portion 5a of polysilicon) was set to 180 GPa, while the radius and the thickness of the diaphragm were set to about 400 μm and about 1 μm respectively and a sound pressure was set to about 10 Pa.

The relation between the elastic modulus of the peripheral vibrating film and sensitivity of the microphone 30 is described with reference to FIG. 7. A change of the electrostatic capacitance between the electrode plate portion 8a and the vibrating portion 5a is increased as the average displacement of the diaphragm 6 (average displacement of the distance between the electrode plate portion 8a and the vibrating portion 5a) is increased, whereby the sensitivity of the microphone 30 is improved as the average displacement of the diaphragm 6 is increased. Further, the distance between the electrode plate portion 8a and the vibrating portion 5a can be reduced as the maximum displacement of the diaphragm 6 is reduced, whereby the sensitivity of the microphone 30 is improved as the maximum displacement of the diaphragm 6 is reduced (refer to the above expressions (5) and (6)). Therefore, the sensitivity of the microphone 30 is improved as the value obtained by dividing the average displacement of the diaphragm 6 by the maximum displacement of the diaphragm 6 is increased.

As shown in FIG. 7, it is understood that the value obtained by dividing the average displacement of the diaphragm 6 by the maximum displacement of the diaphragm 6 is increased as the elastic modulus of the peripheral vibrating film is reduced, to improve the sensitivity of the microphone 30. It is also understood that the value obtained by dividing the average displacement of the diaphragm 6 by the maximum displacement of the diaphragm 6 is abruptly improved when the elastic modulus of the peripheral vibrating film is reduced below about 60 GPa, dissimilarly to the case where the elastic modulus is larger than about 60 GPa. In other words, it is understood that the point where the elastic modulus of the peripheral vibrating film reaches about 60 GPa is the inflection point of the sensitivity of the microphone 30. The vibrating portion 4c of the microphone 30 according to the first embodiment is made of SiOC having the low elastic modulus of about 6.8 GPa, whereby it has been confirmable from the result of this simulation that the sensitivity of the microphone 30 according to the first embodiment can be increased.

Figure 8:
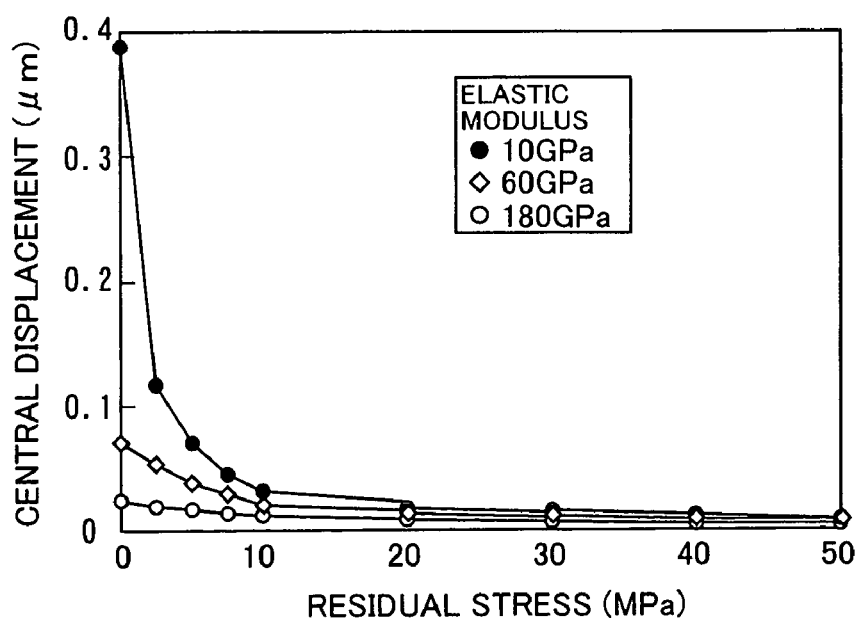
FIG. 8 is a graph showing the relation between residual stress values of another diaphragm at various elastic moduli (180 GPa, 60 GPa and 10 GPa) and central displacements obtained by another simulation.

FIG. 8 is a graph showing the relation between residual stress values of another diaphragm at various elastic moduli (180 GPa, 60 GPa and 10 GPa) and a central displacement obtained by another simulation. In this simulation, the diaphragm was formed by a single layer with a thickness of 1 μm and a radius of 250 μm, while a pressure was set to 10 Pa.

The relation between the residual stress values at various elastic moduli (180 GPa, 60 GPa and 10 GPa) of the diaphragm and the central displacement is described with reference to FIG. 8. First, the central displacement of the diaphragm at each elastic modulus is reduced as the residual stress is increased. Further, it is understood that the central displacement is remarkably reduced with respect to increase of the residual stress as the elastic modulus of the diaphragm is reduced. The diaphragm 6 of the microphone 30 according to the first embodiment is formed by stacking the vibrating portions 5a and 4c having the high and low elastic moduli respectively. The displacement of the diaphragm 6, mainly depending on the displacement of the low-elasticity vibrating portion 4c formed on the periphery of the high-elasticity vibrating portion 5a, is reduced as the displacement of the low-elasticity vibrating portion 4c is reduced due to residual stress. Thus, it is understood that the displacement of the diaphragm 6 is remarkably reduced to remarkably reduce the sensitivity of the microphone 30 when residual stress is present in the low-elasticity vibrating portion 4c. It has been confirmable to be possible to avoid remarkable reduction of the sensitivity of the microphone 30 according to the first embodiment since the vibrating portion 4c is so modified that the residual stress is 0 Pa.

The process of manufacturing the microphone 30 according to the first embodiment of the present invention is now described with reference to FIGS. 1 and 9 to 24.

Figure 9:
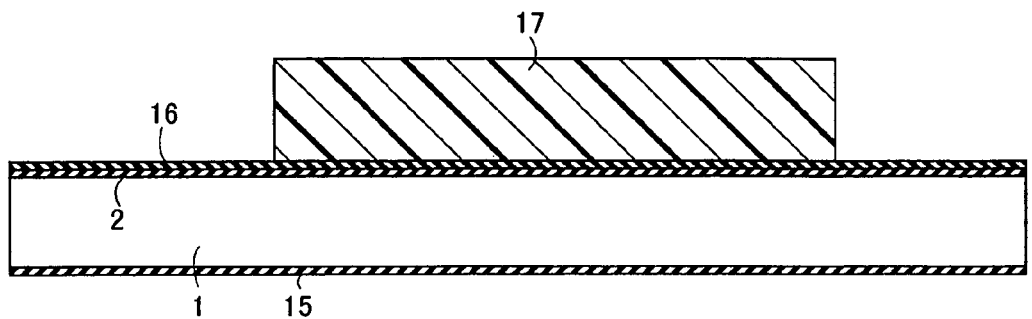
FIGS. 9 to 24 are sectional views for illustrating a process of manufacturing the microphone according to the first embodiment shown in FIG. 1.

First, the surface of the silicon substrate 1 is polished, and the etching stopper film 2 of SiN having the thickness of about 0.05 μm to about 0.2 μm and a mask layer 15 are thereafter formed on the overall surface and the overall back surface of the silicon substrate 1 respectively by LP-CVD low-pressure chemical vapor deposition), as shown in FIG. 9. Thereafter a sacrifice layer 16 of PSG (phosphorus-added $SiO_2$) having a thickness of about 0.5 μm to about 1 μm is formed on the overall surface of the etching stopper film 2 by plasma CVD or atmospheric pressure CVD. Thereafter a resist film 17 is formed on a prescribed region of the sacrifice layer 17 by photolithography.

Figure 10:
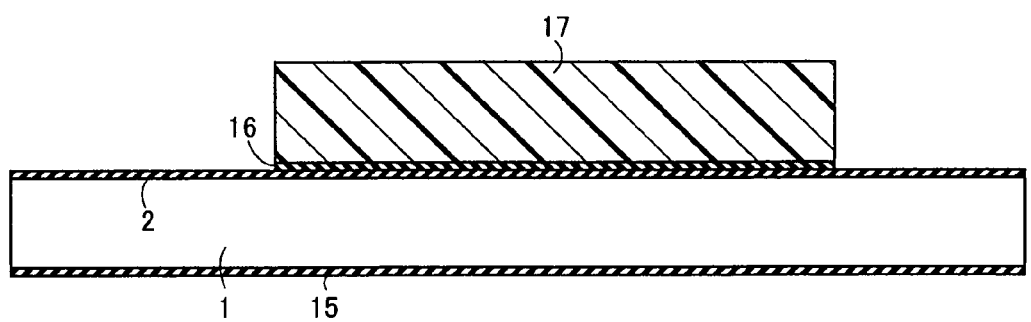

Then, the resist film 17 is employed as a mask for patterning the sacrifice layer 16 into a shape shown in FIG. 10 by dry etching. Thereafter the resist film 17 is removed.

Figure 11:
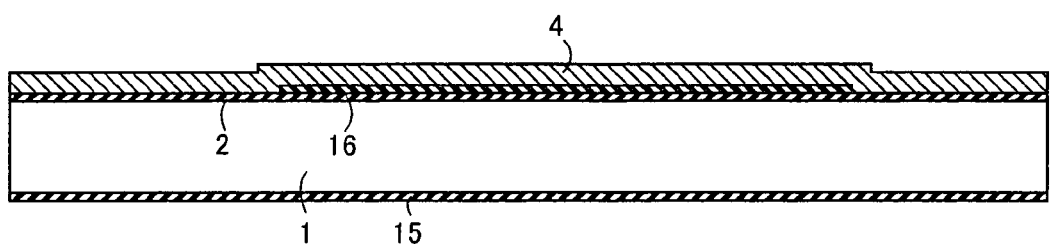

As shown in FIG. 11, the SiOC layer 4 having the thickness of about 1.125 μm is formed on the overall surfaces of the etching stopper layer 2 and the sacrifice layer 16 by plasma CVD. More specifically, the SiOC layer 4 is formed with a gas mixture of trimethylsilane and oxygen under conditions of a film forming temperature of about 350° C., a film forming pressure of about 532 Pa (about 4.0 Torr) and high-frequency power of about 600 W.

Figure 12:
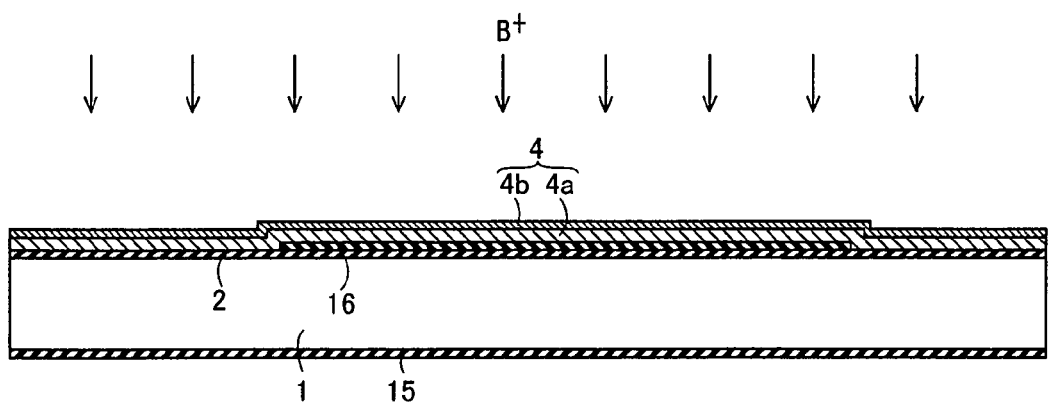

As shown in FIG. 12, ion implantation is performed in order to modify the SiOC layer 4 up to a depth of about 0.125 μm from the upper surface thereof. More specifically, boron ions ($B^+$) are implanted under conditions of implantation energy of about 30 keV and an implantation rate of about $2 \times 10^{15}$ $cm^{-2}$, so that the SiOC layer 4 consists of the lower unmodified SiOC layer 4a having the thickness of about 1.0 μm and the upper modified SiOC layer 4b having the thickness of about 0.125 μm.

Figure 13:
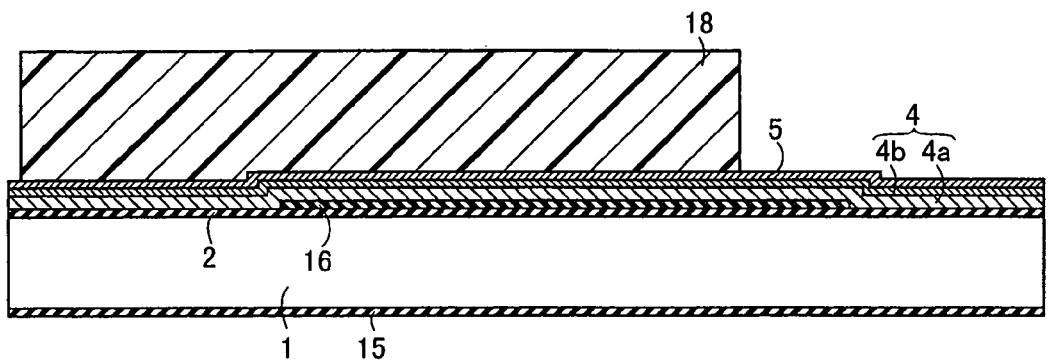
Figure 14:
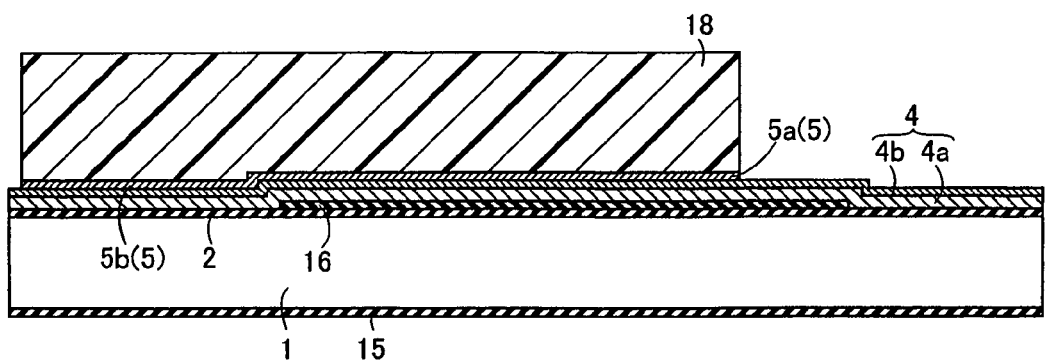

As shown in FIG. 13, the polysilicon layer 5 having the elastic modulus of about 160 GPa to about 190 GPa with the thickness of about 0.5 μm to about 1 μm is formed on the overall surface of the SiOC layer 4 by LP-CVD with source gas of monosilane or disilane, and solid state phosphorus diffusion is thereafter performed with phosphorus oxychloride ($POCl_3$) under a temperature condition of about 875° C. for converting the polysilicon layer 5 to a high-concentration $n^+$ type layer. Thereafter a resist film 18 is formed on a prescribed region of the polysilicon layer 5 by photolithography. As shown in FIG. 14, the resist film 18 is employed as a mask for patterning the polysilicon layer 5 by dry etching, so that the polysilicon layer 5 includes the vibrating portion 5a (see FIG. 4) discoidal in plan view and the connecting wire portion 5b extending toward the electrode 11. Thereafter the resist film 18 is removed.

Figure 15:
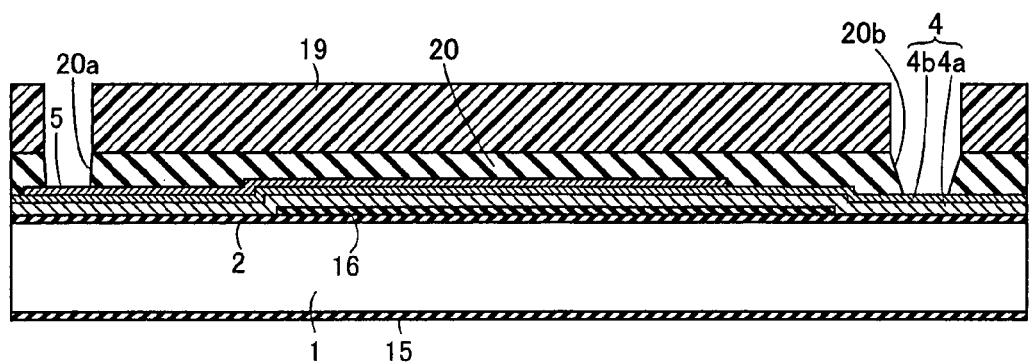

Then, the sacrifice layer 20 of PSG having a thickness of about 2 μm to about 5 μm is formed by plasma CVD or atmospheric pressure CVD to cover the overall surfaces of the SIOC layer 4 and the polysilicon layer 5, and a resist film 19 is formed on a prescribed region of the sacrifice layer 20 by photolithography, as shown in FIG. 15. Thereafter the resist film 19 is employed as a mask for patterning the sacrifice layer 20 by dry etching, so that the sacrifice layer 20 has openings 20a and 20b. Thus, the sacrifice layer 20 is so patterned as to form the air gap 7 (see FIG. 1). Thereafter the resist film 19 is removed.

Figure 16:
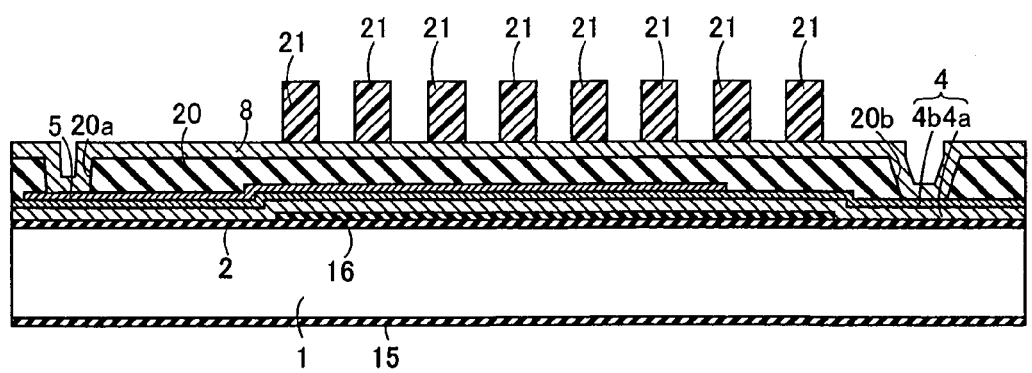
Figure 17:
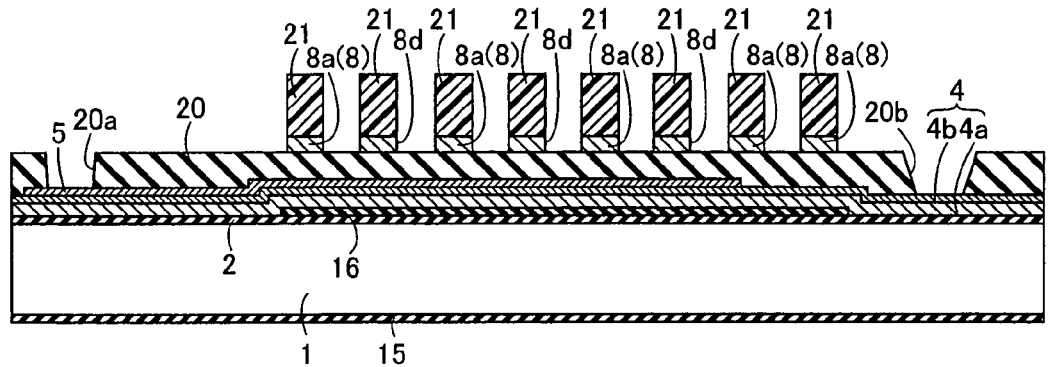

As shown in FIG. 16, the polysilicon layer 8 having the thickness of about 1.0 μm is formed on the overall surfaces of the SiOC layer 4, the polysilicon layer 5 and the sacrifice layer 20 by CVD with monosilane gas or disilane. Thereafter solid state phosphorus diffusion is performed with phosphorus oxychloride (POCl$_3$) under a temperature condition of about 875° C. for converting the polysilicon layer 8 to a high-concentration n+type layer. Thereafter resist films 21 are formed on prescribed regions of the polysilicon layer 8 by photolithography. As shown in FIG. 17, the resist films 21 are employed as masks for patterning the polysilicon layer 8 so that the polysilicon layer 8 includes the electrode plate portion 8a having the holes 8d on the positions corresponding to the sonic holes 10 and the connecting wire portion 8b. Thereafter the resist films 21 are removed.

Figure 18:
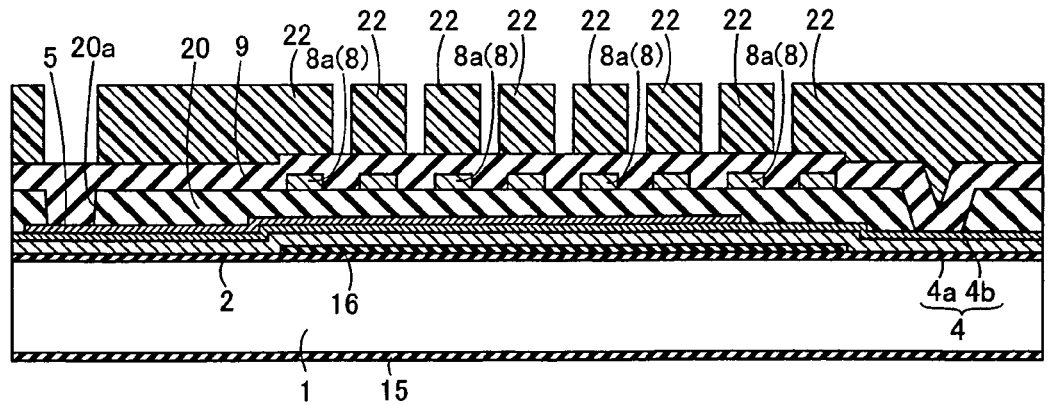
Figure 19:
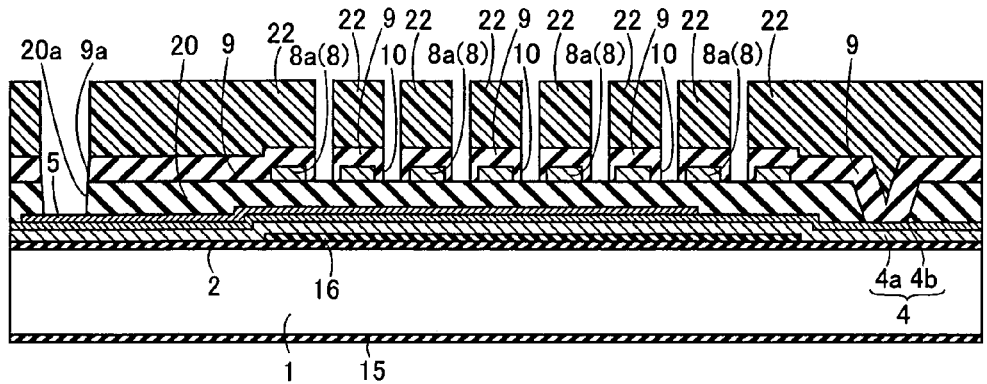

As shown in FIG. 18, the protective film 9 of SiN having the thickness of about 1 μm is formed on the overall surfaces of the SiOC layer 4, the polysilicon layers 5 and 8 and the sacrifice layer 20 by CVD with a gas mixture of monosilane and ammonia or dichlorosilane and ammonia at a film forming temperature of about 300° C. to about 600° C. Resist films 22 are formed on prescribed regions of the protective film 9 by photolithography. As shown FIG. 19, the resist films 22 are employed as masks for patterning the protective film 9 by dry etching, so that the protective film 9 includes the sonic holes 10 and the contact holes 9a and 9b (see FIG. 3). Thereafter the resist films 22 are removed.

Figure 20:
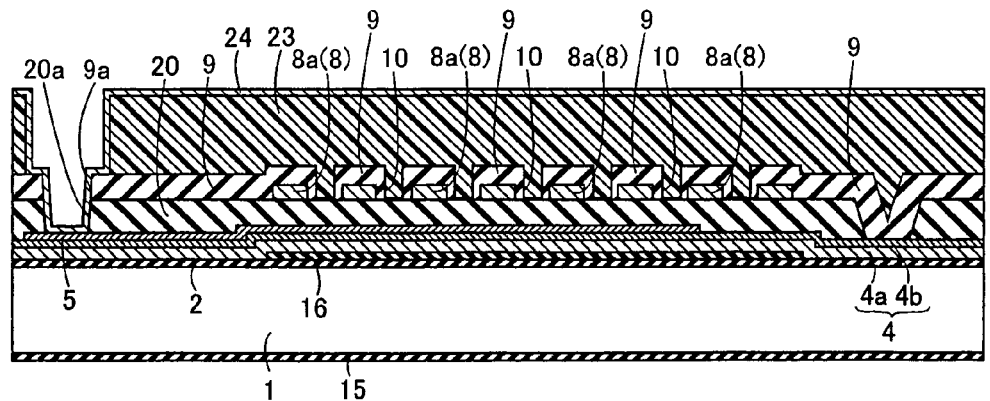
Figure 21:
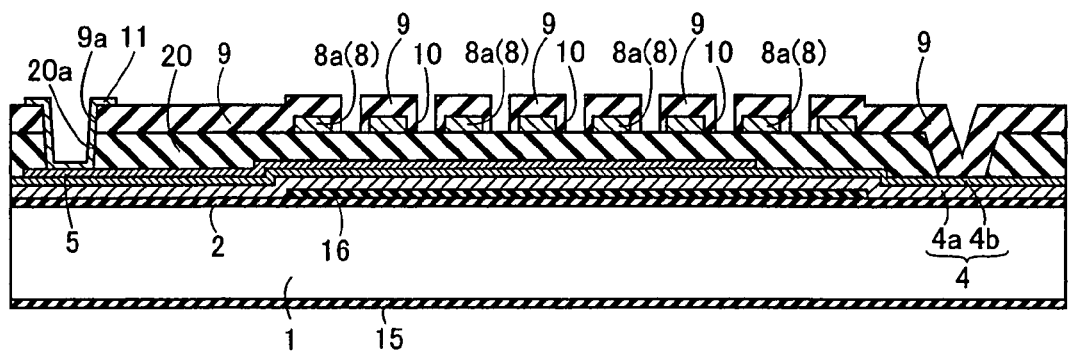

As shown in FIG. 20, a resist film 23 is formed on a prescribed region of the protective film 9. Thereafter a metal layer 24 consisting of an Au layer having a thickness of about 500 nm and a Cr layer having a thickness of about 100 nm is formed to be connected to the contact regions 5c and 8c of the polysilicon layers 5 and 8 through the contact hole 9a, the opening 20a and the contact hole 9b (see FIG. 3). The resist film 23 and the metal layer 24 formed on the resist film 23 are removed by a lift-off method with an organic solvent (acetone, for example), thereby forming the electrode 11 as shown in FIG. 21. The electrode 12 (see FIG. 3) is also formed simultaneously with the electrode 11. The electrodes 11 and 12 may alternatively be formed by a technique such as photolithography and dry etching or an electroless plated resist method, in place of the aforementioned method.

Figure 22:
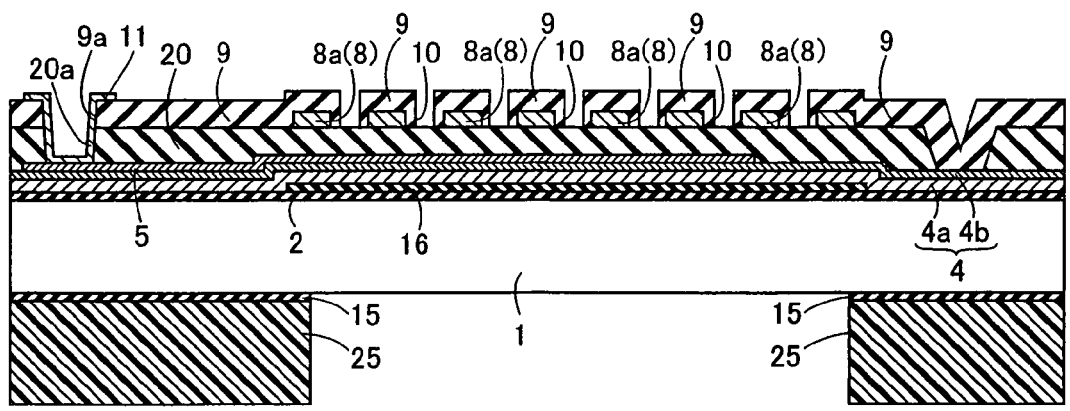

As shown in FIG. 22, resist films 25 are formed on prescribed regions of the surface of the mask layer 15 by photolithography and employed as masks for dry-etching the mask layer 15 with fluorine-based gas, thereby patterning the mask layer 15. Thereafter the resist films 25 are removed.

Figure 23:
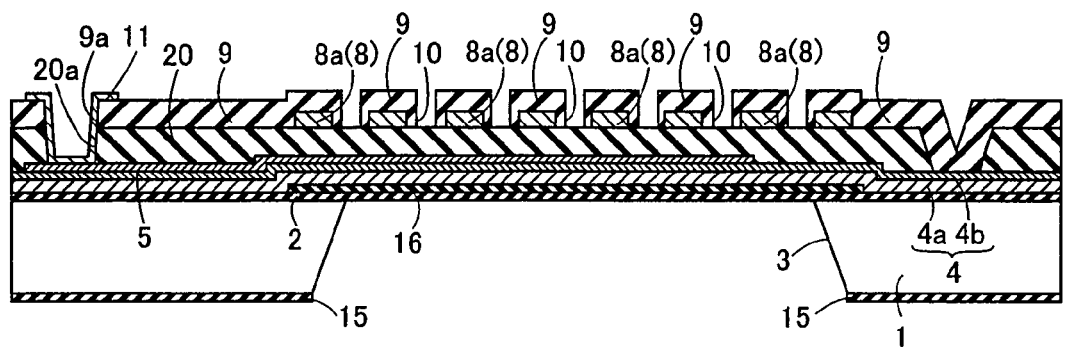

As shown in FIG. 23, the mask layer 15 is employed as a mask for forming the opening 3 in the silicon substrate 1 by anisotropic wet etching employing an aqueous solution of tetramethyl ammonium hydroxide (TMAH) or an aqueous solution of potassium hydroxide (KOH).

Figure 24:
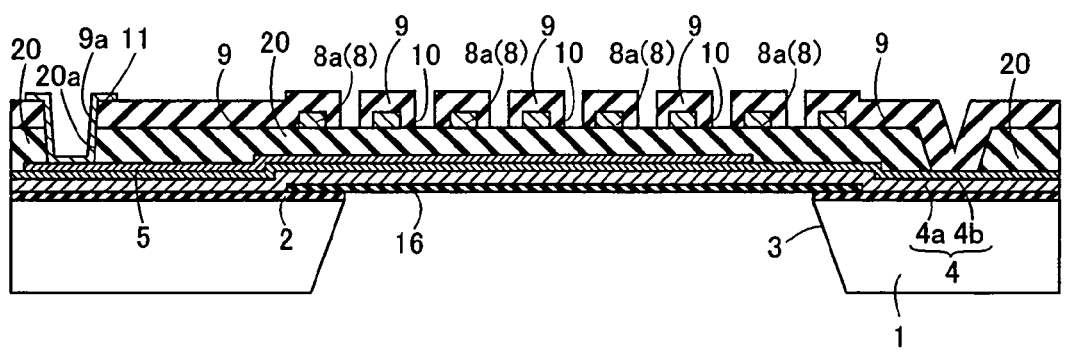

As shown in FIG. 24, the mask layer 15 as well as part of the etching stopper film 2 of SiN exposed through the opening 3 are removed by dry etching with fluorine-based gas. Then, the sacrifice layer 16 is removed by wet etching with hydrofluoric acid, while parts of the sacrifice layer 20 located between the modified SiOC layer 4b and the diaphragm 6 and between the fixed electrode 8a and the protective film 9 are removed by introducing hydrofluoric acid from the sonic holes 10 thereby forming the air gap 7. The sacrifice layer 20 partially remains unremoved on portions formed with, no sonic holes 10. Thus, the microphone 30 according to the first embodiment is completed as shown in FIG. 2.

Second Embodiment

Figure 25:
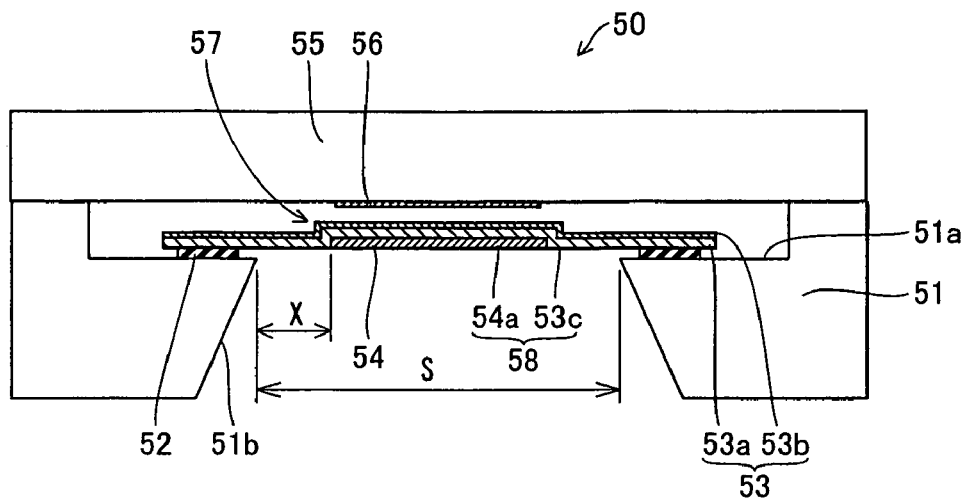
FIG. 25 is a sectional view showing the structure of a pressure sensor according to a second embodiment of the present invention.

Referring to FIG. 25, a second embodiment of the present invention is applied to a pressure sensor 50, dissimilarly to the aforementioned first embodiment. The structure of the pressure sensor 50 according to the second embodiment of the present invention is described with reference to FIG. 25.

As shown in FIG. 25, the pressure sensor 50 according to the second embodiment comprises a silicon substrate 51, a silicon oxide film 52, an SiOC layer 53, a polysilicon layer 54, a glass substrate 55 and a fixed electrode 56.

Both surfaces of the silicon substrate 51 formed by a p-type silicon substrate are mirror-finished. A recess portion 51a is formed on the upper surface of the silicon substrate 51, thereby providing a sensor gap 57. The depth of the recess portion 51a is preferably about 1 μm to about 50 μm, more preferably about 20 μm. The silicon substrate 51 is further provided with a partially square-pyramidal (truncated square-pyramidal) opening 51b on a region for forming a diaphragm 58 described later, to pass through the silicon substrate 51. The opening 51b is so provided that the diaphragm 58 receives a pressure (external force).

The silicon oxide film 52 is formed on the bottom surface of the recess portion 51a of the silicon substrate 51 to enclose the opening 51b. This silicon oxide film 52 is formed by thermally oxidizing the silicon substrate 51. The thickness of the silicon oxide film 52 is preferably about 100 nm to about 1000 nm, more preferably about 300 nm.

The SiOC layer 53 is formed on the upper surface of the silicon oxide film 52, to block the opening 51b. This SiOC layer 53 has a low elastic modulus of about 6.8 GPa. The thickness of the SiOC layer 53 is preferably about 0.5 μm to about 5 μm, more preferably about 1 μm. Further, the SiOC layer 53 consists of a lower unmodified SiOC layer 53a and an upper modified SiOC layer 53b modified by ion implantation described later. The unmodified SiOC layer 53a has residual stress (tensile stress) of 50 MPa. The modified SiOC layer 53b is so modified as to have such compressive stress that the residual stress in the overall SiOC layer 53 reaches 0 Pa, similarly to that expressed in the above expression (7) related to the first embodiment. A vibrating portion 53c is formed on a portion of the SiOC layer 53 located above the opening 51b. This vibrating portion 53c is in the form of a square having a length S (about 400 μm in the second embodiment) of each side in plan view. The vibrating portion 53c of the SiOC layer 53 is an example of the "second elastic film" in the present invention.

According to the second embodiment, the polysilicon layer 54 having an elastic modulus (about 160 GPa to about 190 GPa) higher than the elastic modulus (about 6.8 GPa) of the SiOC layer 53 is formed on a central portion of the lower surface of the vibrating portion 53c of the SiOC layer 53. The thickness of the polysilicon layer 54 is preferably about 0.5 μm to about 5 μm, more preferably about 1 μm. The polysilicon layer 54, doped with an n-type impurity (phosphorus (P)), is conductive. The polysilicon layer 54 includes a vibrating portion 54a concentric with the vibrating portion 53c in plan view. The vibrating portion 53c of the SiOC layer 53 located above the opening 51b and the vibrating portion 54a of the polysilicon layer 54 constitute the diaphragm 58. The vibrating portion 54a is in the form of a square provided with sides each having a length of about 240 μm to about 280 μm. In other words, the width X of a low elasticity film formed with only the vibrating portion 53c of the diaphragm 58 is about 60 μm to about 80 μm. The sensor gap 57 is provided above the diaphragm 58. The vibrating portion 54a of the polysilicon layer 54 is an example of the "first elastic film" in the present invention.

The glass substrate 55 having a thickness of about 500 μm is bonded to the upper surface of the silicon substrate 51 excluding the recess portion 51a. The fixed electrode 56 of chromium (Cr) is formed on the lower surface of the glass substrate 55 on a position opposite to the vibrating portion 54a of the diaphragm 58 through the sensor gap 57. The thickness of the fixed electrode 56 is preferably about 0.1 μm to about 1.0 μm, more preferably about 0.5 μm. The fixed electrode 56 is in the form of a square, provided with sides each having a length of about 240 μm, concentric with the diaphragm 58 in plan view. The fixed electrode 56 is an example of the "electrode plate" in the present invention.

Operations of the pressure sensor 50 according to the second embodiment are now described with reference to FIGS. 25 and 26. It is assumed that a constant voltage is applied between the vibrating portion 54a and the fixed electrode 56.

When the pressure sensor 50 receives no pressure, the diaphragm 58 remains unvibrational, as shown in FIG. 25. Therefore, the electrostatic capacitance between the vibrating portion 54a and the fixed electrode 56 remains unchanged, so that no charges flow from (into) the vibrating portion 54a and the fixed electrode 56.

Figure 26:
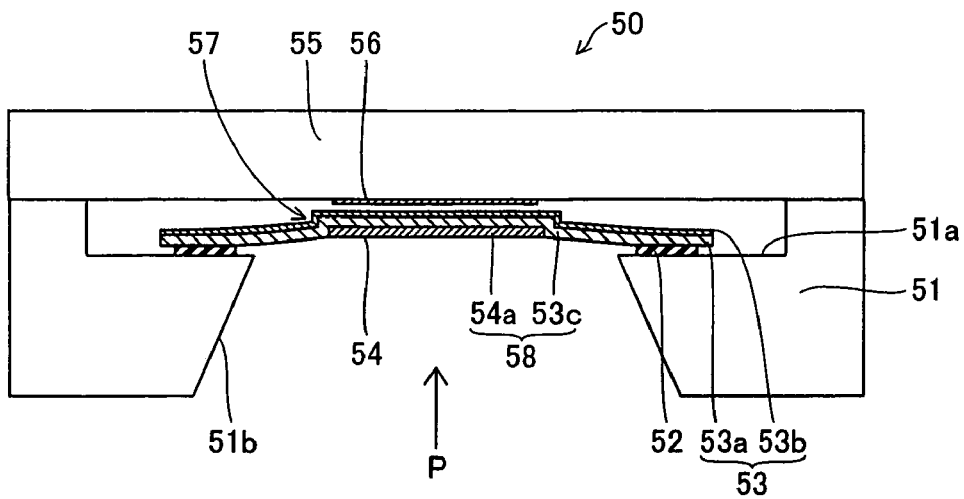
FIG. 26 is a sectional view for illustrating the operating principle of the pressure sensor according to the second embodiment shown in FIG. 25.

When the pressure sensor 50 receives a pressure along arrow P (see FIG. 26), on the other hand, the diaphragm 58 vibrates as shown in FIG. 26. Therefore, the electrostatic capacitance between the vibrating portion 54a and the fixed electrode 56 so changes that charges flow from (into) the vibrating portion 54a and the fixed electrode 56. The pressure sensor 50 outputs the charges flowing from (into) the vibrating portion 54a and the fixed electrode 56 as an electric signal corresponding to the received pressure.

According to the second embodiment, as hereinabove described, the pressure sensor 50 is provided with the diaphragm 58 including the vibrating portion 54a of polysilicon (elastic modulus: about 160 GPa to about 190 GPa) and the vibrating portion 53c of SiOC (elastic modulus: about 6.8 GPa) having the lower elastic modulus than polysilicon so that the vibrating portion 53c arranged on the peripheral portion of the vibrating portion 54a can vibrate to vibrate the vibrating portion 54a and the vibrating portion 54a having the higher elastic modulus than the vibrating portion 53c can be inhibited from bending as compared with the vibrating portion 53c. Thus, the diaphragm 58 can be inhibited from coming into contact with the fixed electrode 56 upon remarkable vibration of the vibrating portion 53c, whereby the distance between the diaphragm 58 and the fixed electrode 56 can be reduced in the pressure sensor 50. Consequently, sensitivity of the pressure sensor 50 can be improved. Further, the diaphragm 58 of the pressure sensor 50 is constituted of the vibrating portion 54a of polysilicon having the higher elastic modulus (about 160 GPa to about 190 GPa) and the vibrating portion 53c of SiOC having the lower elastic modulus (about 6.8 GPa) so that the vibrating portion 53c may not be reduced in thickness or width in order to have a low elastic modulus, whereby the vibrating portion 53c can be inhibited from reduction of mechanical strength. Thus, the sensitivity of the pressure sensor 50 can be improved, and the diaphragm 58 including the vibrating portion 53c can be inhibited from breakage.

According to the second embodiment, the SiOC layer 53 including the vibrating portion 53c is so modified that the residual stress in the vibrating portion 53c is 0 Pa, whereby the vibrating portion 53c having no residual stress can more largely vibrate to further improve the sensitivity of the pressure sensor 50. Further, the SiOC layer 53 is so modified by ion implantation that the depth of the modification can be precisely controlled. In addition, the vibrating portion 53c, arranged to enclose the outer periphery of the vibrating portion 54a while covering the upper surface thereof, can be further improved in strength.

Simulations performed for confirming effects of the aforementioned second embodiment are now described.

Figure 27:
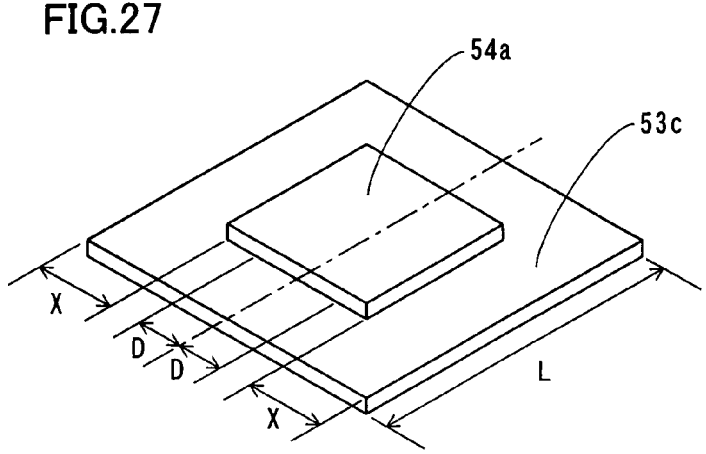
FIG. 27 is a perspective view showing the structure of each diaphragm employed for each simulation.
Figure 28:
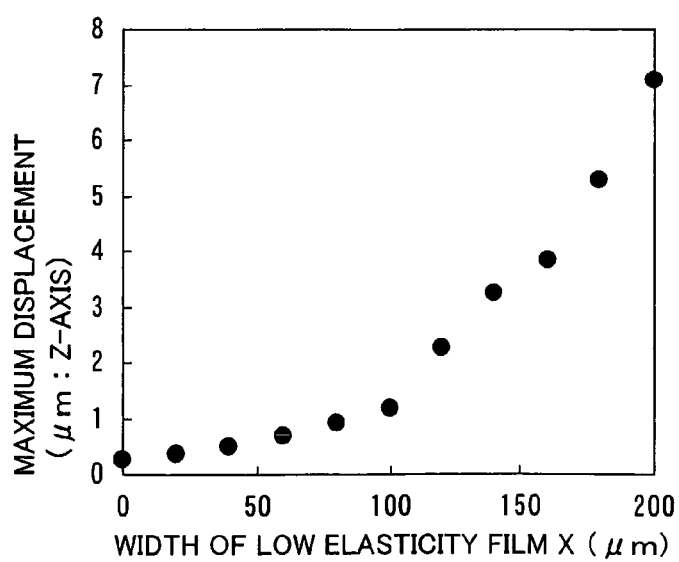
FIG. 28 is a graph showing the relation between the width of a low elasticity film and the maximum displacement obtained by a simulation.

FIG. 27 is a perspective view showing the structure of each diaphragm employed for each simulation. This diaphragm includes vibrating portions 53c and 54a formed by films having low and high elastic moduli respectively. The vibrating portion 53c is in the form of a square having a length L of each side. The vibrating portion 54a is squarely formed on the upper surface of the vibrating portion 53c concentrically therewith in plan view. FIG. 28 is a graph showing the relation between the width (X in FIG. 27) of a low elasticity film formed with only a film having a low elastic modulus and the maximum displacement of a diaphragm obtained by a simulation. In this simulation, the elastic modulus and the thickness of a central high elasticity film (vibrating portion 54a) were set to 180 GPa and 0.8 μm respectively, the elastic modulus, the thickness and the length L of each side of a low elasticity film (vibrating portion 53c) were set to 10 GPa, 0.8 μm and 400 μm respectively, and an applied pressure was set to about 100 Pa.

The relation between the width X of the low elasticity film and the maximum displacement of the diaphragm is now described with reference to FIG. 28. The distance between a fixed electrode 56 and the vibrating portion 54a can be reduced as the maximum displacement of the diaphragm is reduced. A change of the electrostatic capacitance with respect to the displacement of the diaphragm can be increased by reducing the distance between the fixed electrode 56 and the vibrating portion 54a, whereby the sensitivity of a pressure sensor is improved as the maximum displacement of the diaphragm is reduced (refer to the above expressions (5) and (6)). It is understood that the maximum displacement is reduced as the width X of the low elasticity film is reduced. It is also understood that the change of the maximum displacement is abruptly reduced when the width X of the low elasticity film is reduced below about 100 μm, dissimilarly to a case where the width X of the low elasticity film is in excess of about 100 μm. In other words, it is understood that the point where the width X of the low elasticity film reaches about 100 μm is the inflection point of the maximum displacement. According to the second embodiment, the width X of the low elasticity film is about 60 μm to about 80 μm, whereby the maximum displacement can be reduced in the pressure sensor 50 according to the second embodiment from the result of this simulation. Thus, it has been confirmable that the distance between the fixed electrode 56 and the vibrating portion 54a can be so reduced as to increase the sensitivity of the pressure sensor 50.

Figure 29:
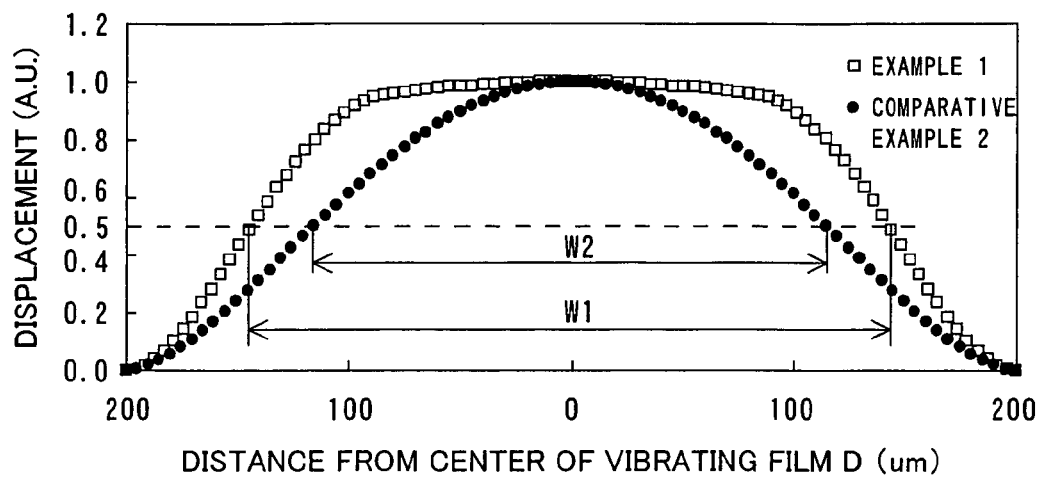
FIG. 29 is a graph showing the relation between the distance from the center of a vibrating film and displacements obtained by another simulation.

FIG. 29 is a graph showing the relation between the distance from the center of a vibrating film and displacements of other diaphragms obtained by another simulation. In this simulation, a diaphragm according to Example 1 corresponding to the aforementioned second embodiment was formed by a low elasticity film and a high elasticity film, while the width X of the low elasticity film was set to 100 μm. Further, another diaphragm according to comparative example 2 corresponding to the prior art was entirely formed by a high elasticity film without forming a low elasticity film. Displacements of the diaphragms according to Example 1 and comparative example 2 were calculated and relativized so that the resulting maximum displacements were equal to each other.

The relation between the distance D from the center of the vibrating film and the displacement of the diaphragm is now described with reference to FIG. 29. A change of the electrostatic capacitance between the fixed electrode 56 and the vibrating portion 54a is increased as the average displacement of the diaphragm (average displacement between the fixed electrode 56 and the vibrating portion 54a) is increased, whereby the sensitivity of the pressure sensor is improved as the average displacement of the diaphragm is increased. The distance between the fixed electrode 56 and the vibrating portion 54a can be reduced as the maximum displacement of the diaphragm is reduced as described above, whereby the sensitivity of the pressure sensor is improved as the maximum displacement of the diaphragm is reduced. As shown in FIG. 29, it is understood that the half width is increased when the diaphragm according to Example 1 is employed, as compared with the case of employing the diaphragm according to comparative example 2. The term "half width" denotes a spreading width of a peak at a height half the peak height (maximum displacement). Referring to FIG. 29, the diaphragms according to Example 1 and comparative example 2 exhibit half widths W1 and W2 respectively. The half width W1 of the diaphragm according to Example 1 is larger than the half width W2 of the diaphragm according to comparative example 2, whereby the average displacement with respect to the maximum displacement is more increased in the diaphragm according to Example 1 as compared with the diaphragm according to comparative example 2.

Figure 30:
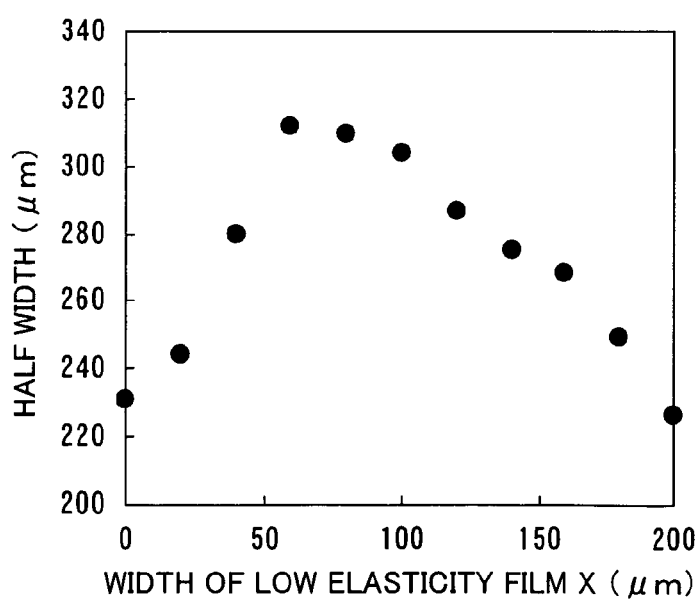
FIG. 30 is a graph showing the relation between the width of the low elasticity film and a half width obtained by still another simulation.

FIG. 30 is a graph showing the relation between the width X of the low elasticity film and the half width obtained by still another simulation. The relation between the width X of the low elasticity film and the half width is now described with reference to FIG. 30. It is understood from FIG. 29 that the average displacement with respect to the maximum displacement is increased as the half width is increased. It is also understood that the half width is increased until the width X of the low elasticity film reaches about 60 μm, and reduced when the width X of the low elasticity film exceeds about 80 μm. In other words, it is understood that the half width is increased when the width X of the low elasticity film is about 60 μm to about 80 μm. According to the second embodiment, the width X of the low elasticity film is about 60 μm to about 80 μm, whereby it can be said that the half width is increasable in the pressure sensor 50 according to the second embodiment from the result of this simulation. Thus, it has been confirmable that the average displacement with respect to the maximum displacement can be so increased as to increase the sensitivity of the pressure sensor 50.

Figure 31:
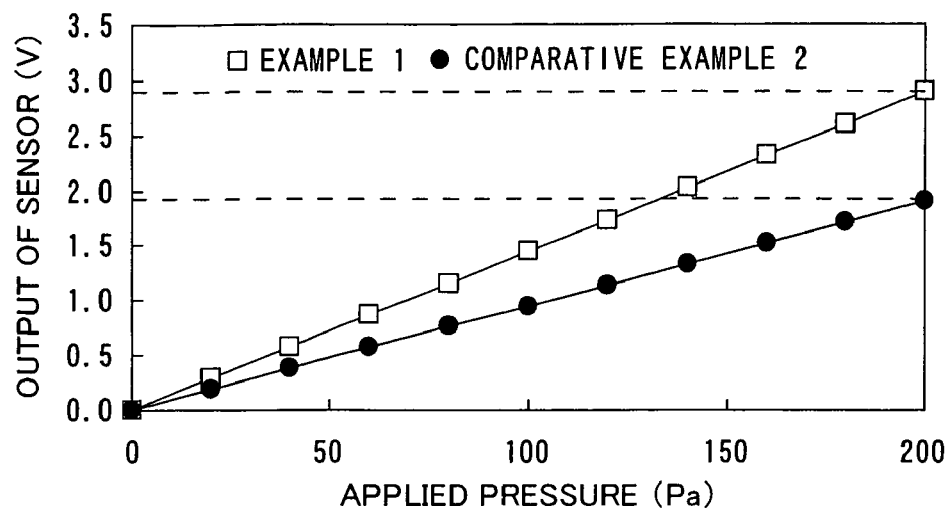
FIG. 31 is a graph showing the relation between an applied pressure and sensor outputs obtained by a further simulation.

FIG. 31 is a graph showing the relation between an applied pressure and sensor outputs obtained by a further simulation. In this simulation, sensor gap values of the pressure sensors according to Example 1 and comparative example 2 were so changed that withstand pressures were 200 Pa, fixed electrodes were shaped into squares provided with sides each having a length of 240 μm, and a bias voltage was set to 2 V. The relation between the applied pressure and the sensor output is now described with reference to FIG. 31. It is understood that the outputs of the pressure sensors according to Example 1 and comparative example 2 are increased as the applied pressure is increased. At this time, the gradients (sensitivity) of the pressure sensors according to Example 1 and comparative example 2 are about 0.0145 and about 0.0975 respectively. Thus, it is understood that the sensitivity of the pressure sensor according to Example 1 is improved by about 50% as compared with the pressure sensor according to comparative example 2.

A process of manufacturing the pressure sensor 50 according to the second embodiment of the present invention is now described with reference to FIGS. 25 and 32 to 44.

Figure 32:
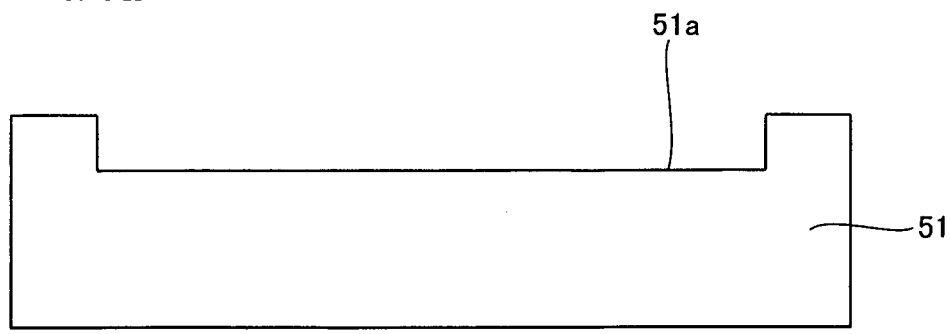
FIGS. 32 to 44 are sectional views for illustrating a process of manufacturing the pressure sensor according to the second embodiment shown in FIG. 25.

First, the overall upper and lower surfaces of the silicon substrate 51 are mirror-finished, and the recess portion 51a for forming the sensor gap 57 is formed on the upper surface of the silicon substrate 51 by photolithography and dry etching, as shown in FIG. 32. This recess portion 51a is so formed that the depth thereof is about 1 μm to about 50 μm, more preferably about 20 μm.

Figure 33:
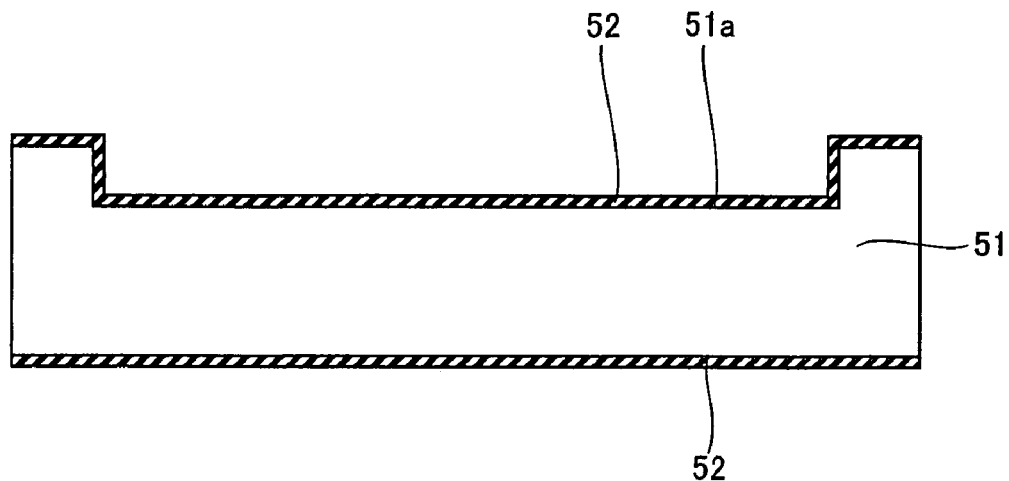
Figure 34:
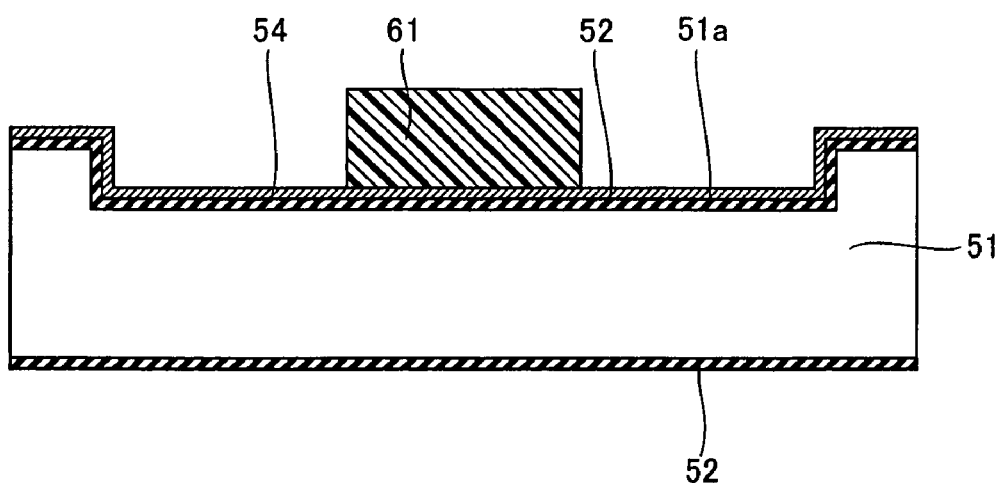
Figure 35:
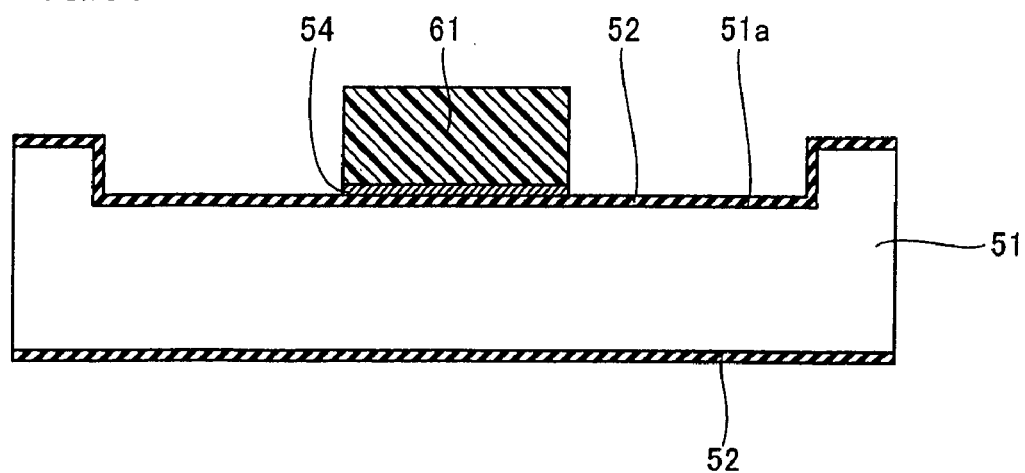

As shown in FIG. 33, silicon oxide films 52 are formed by thermally oxidizing the overall upper and lower surfaces of the silicon substrate 51. This silicon oxide films 52 are so formed that the thickness thereof is preferably about 100 nm to about 1000 nm, more preferably about 300 nm. As shown in FIG. 34, the polysilicon layer 54 is formed on the overall surface of the silicon oxide film 52 provided on the upper surface of the silicon substrate 51 by LP-CVD with source gas of monosilane or disilane. This polysilicon layer 54 is so formed that the thickness thereof is preferably about 0.5 μm to about 5 μm, more preferably about 1 μm. The polysilicon layer 54 has the elastic modulus of about 160 GPa to about 190 GPa. Thereafter solid state phosphorus diffusion is performed with phosphorus oxychloride ($POCl_3$) under a temperature condition of about 875° C. for converting the polysilicon layer 54 to a high-concentration $n^+$ type layer.

As shown in FIG. 34, a resist film 61 is formed on a prescribed region of the polysilicon layer 54 by photolithography. The resist film 64 is employed as a mask for dry-etching the polysilicon layer 54 into a shape shown in FIG. 35. Thereafter the resist film 61 is removed.

Figure 36:
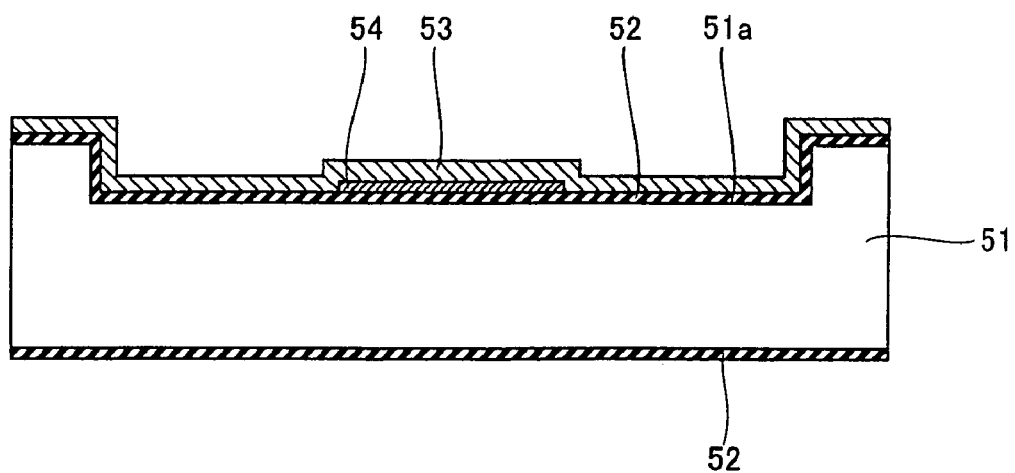

As shown in FIG. 36, the SiOC layer 53 is formed on the overall surfaces of the polysilicon layer 54 and the upper silicon oxide film 52 by plasma CVD. More specifically, the SiOC layer 53 is formed with a gas mixture of trimethylsilane and oxygen under conditions of a film forming temperature of about 350° C., a film forming pressure of about 532 Pa (about 4.0 Torr) and high-frequency power of about 600 W. This SiOC layer 53 is so formed that the thickness thereof is preferably about 0.5 μm to about 5 μm, more preferably about 1 μm.

Figure 37:
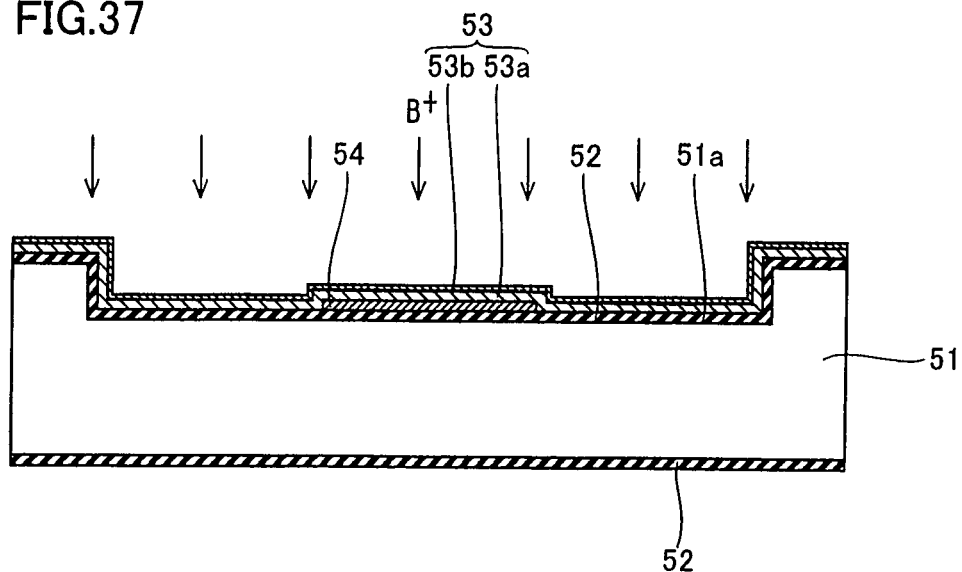

As shown in FIG. 37, boron ions ($B^+$) are implanted in order to modify the SiOC layer 53 up to a prescribed depth from the upper surface thereof. Thus, the SiOC layer 53 consists of the lower unmodified SiOC layer 53a and the upper modified SiOC layer 53b.

Figure 38:
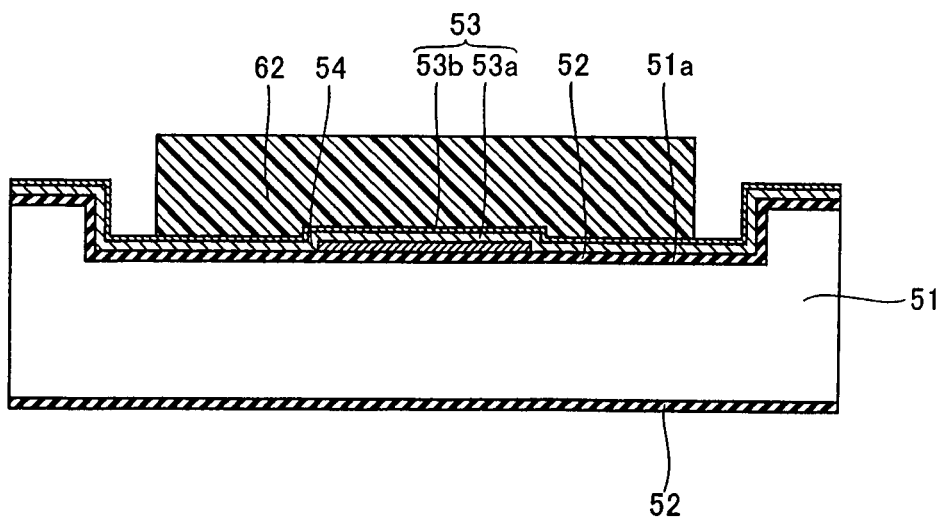
Figure 39:
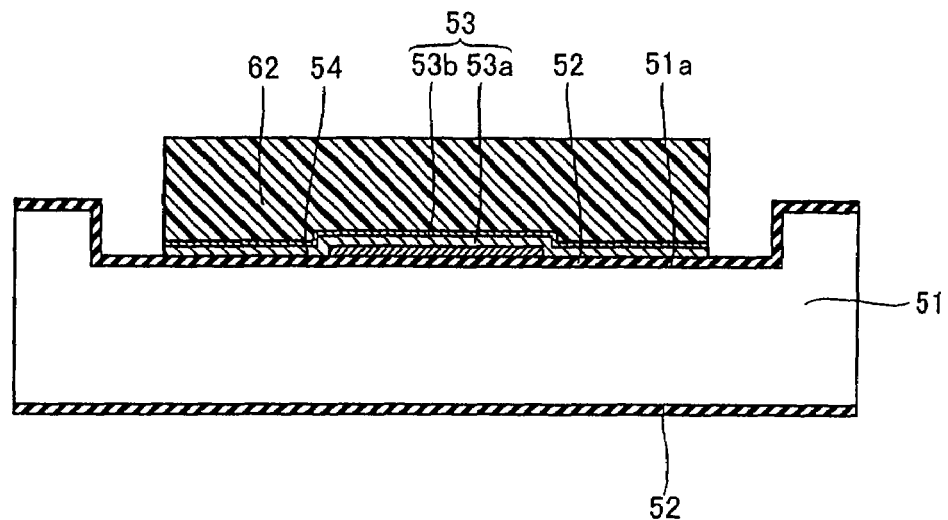

As shown in FIG. 38, a resist film 62 is formed on a prescribed region of the SiOC layer 53 by photolithography. The resist film 62 is employed as a mask for dry-etching the SiOC layer 53 into a shape shown in FIG. 39. Thereafter the resist film 62 is removed.

Figure 40:
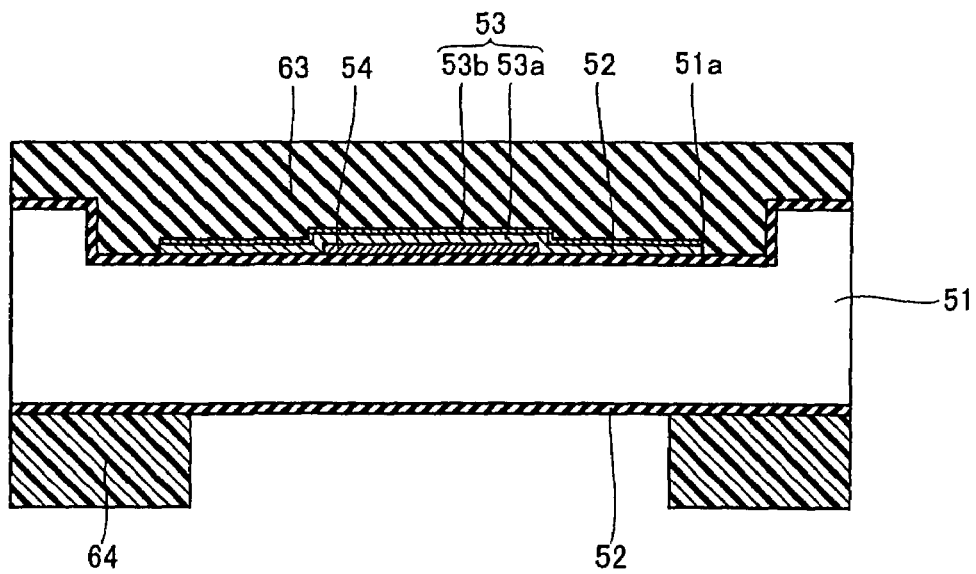
Figure 41:
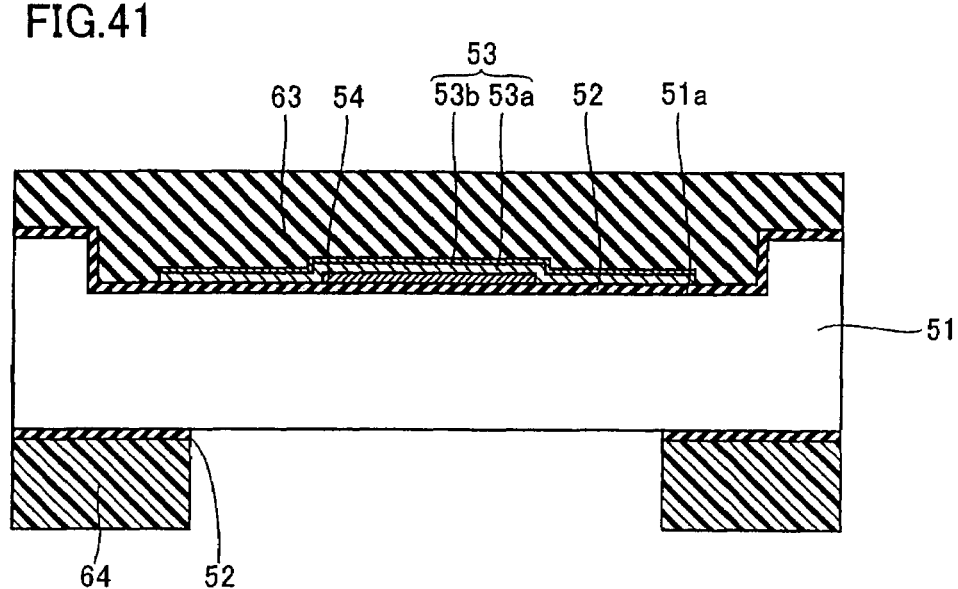

As shown in FIG. 40, the silicon oxide film 63 serving as a protective film is formed on the overall surfaces of the SiOC layer 53 and the upper silicon oxide film 52 by plasma CVD or sputtering. Thereafter resist films 64 are formed on prescribed regions of the silicon oxide film 52 provided on the lower surface of the silicon substrate 51 by photolithography. The resist films 64 are employed as masks for dry-etching the lower silicon oxide film 52 into a shape shown in FIG. 41. Thereafter the resist films 64 are removed.

Figure 42:
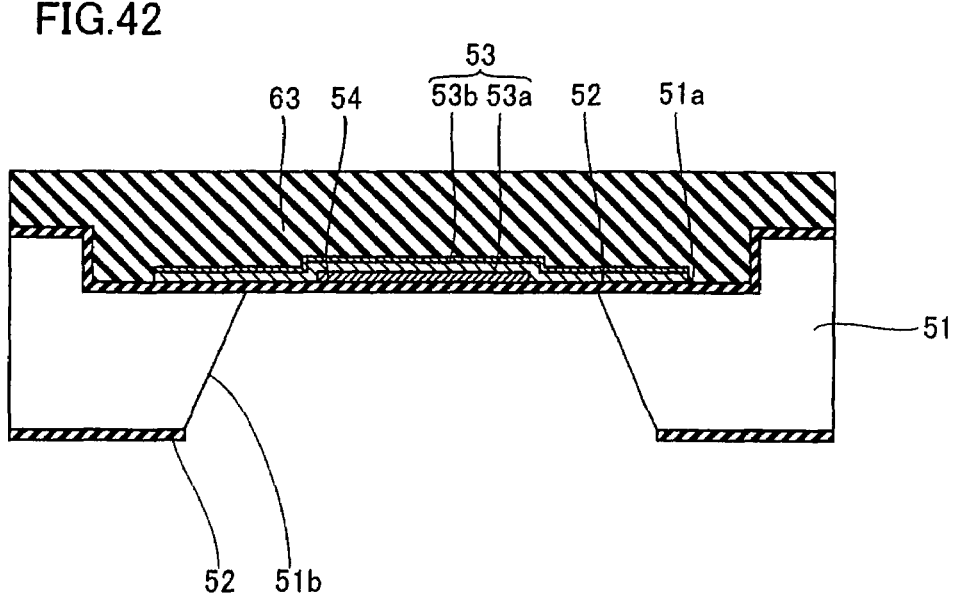
Figure 43:
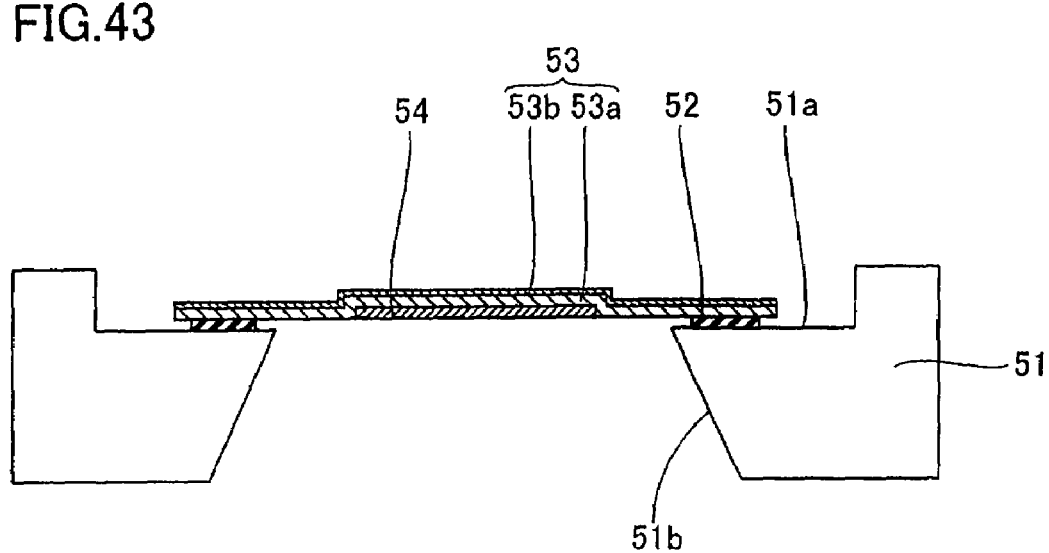

As shown in FIG. 42, the lower silicon oxide film 52 is employed as a mask for forming the opening 51b in the silicon substrate 51 by anisotropic wet etching employing an aqueous solution of tetramethyl ammonium hydroxide (TMAH) or an aqueous solution of potassium hydroxide (KOH). Thereafter the silicon oxide film 63 serving as the protective film, part of the upper silicon oxide film 52 and the lower silicon oxide film 52 are removed by wet etching with hydrofluoric acid (HF), thereby obtaining a structure shown in FIG. 43. The time for this etching is so set that the upper silicon oxide film 52 partially remains between the SiOC layer 53 and the silicon substrate 51.

Figure 44:
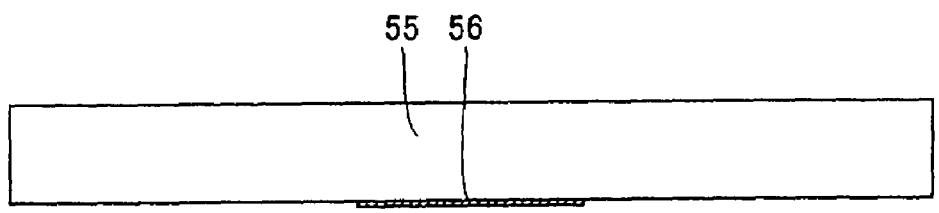

Then, the glass substrate 55 formed with the fixed electrode 56 of chromium as shown in FIG. 44 is bonded to the upper surface of the silicon substrate 51 excluding the recess portion 51*a* by anodic bonding. Thus, the pressure sensor 50 according to the second embodiment is completed as shown in FIG. 25.

Although the present invention has been described and illustrated in detail, it is clearly understood that the same is by way of illustration and example only and is not to be taken by way of limitation, the spirit and scope of the present invention being limited only by the terms of the appended claims.

Figure 45:
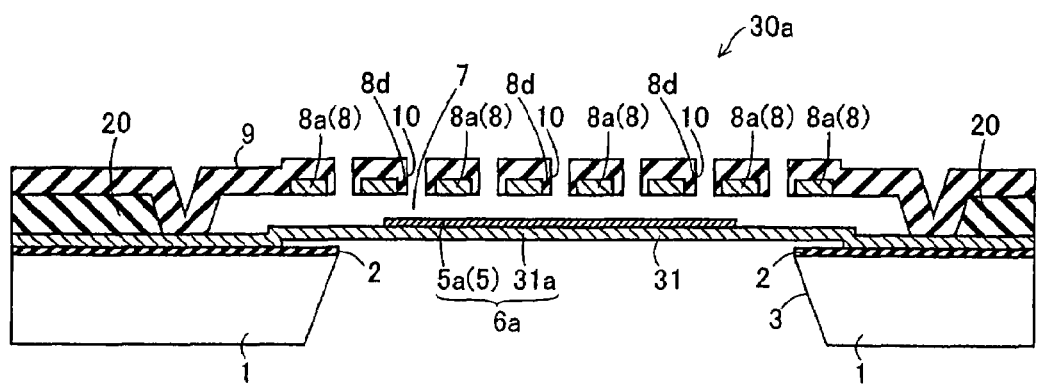
FIG. 45 is a sectional view showing the structure of a microphone according to a first modification of the first embodiment of the present invention.

For example, while the upper layer of the SiOC layer 4 is modified in the aforementioned first embodiment, the present invention is not restricted to this but an SiOC layer 31 including a vibrating portion 31*a* of a diaphragm 6*a* may not be modified as in a microphone 30*a* according to a first modification of the first embodiment shown in FIG. 45. According to this structure, a modification step can be so omitted that the manufacturing process for the microphone 30*a* can be simplified.

Figure 46:
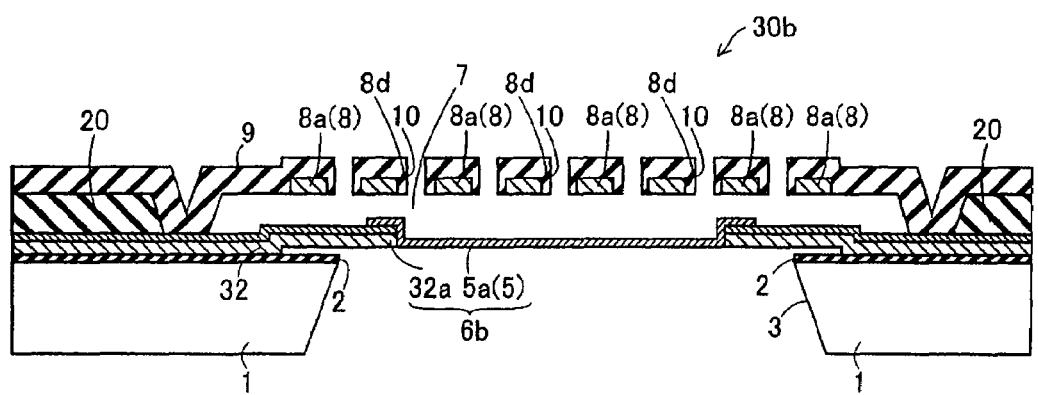
FIG. 46 is a sectional view showing the structure of a microphone according to a second modification of the first embodiment of the present invention.

While the SiOC layer 4 is formed on the overall surface of the diaphragm 6 in an unpatterned state in the aforementioned first embodiment, the present invention is not restricted to this but an SiOC layer 32 may be patterned by previously etching a vibrating potion 32*a* of the SiOC layer 32 provided inside the outer periphery of a vibrating portion 5*a* so that the vibrating portion 32*a* is formed only on a peripheral portion of a diaphragm 6*b* as in a microphone 30*b* according to a second modification of the first embodiment shown in FIG. 46.

While the SiOC layer is so modified that the residual stress reaches 0 Pa in each of the aforementioned embodiments, the present invention is not restricted to this but the SiOC layer may alternatively be so modified as to reduce the residual stress.

While the SiOC layer is modified by ion implantation in each of the aforementioned embodiments, the present invention is not restricted to this but the SiOC layer may alternatively be modified by another method.

While SiOC is employed as the material for the low elasticity layer (SiOC layer) in each of the aforementioned embodiments, the present invention is not restricted to this but another material may alternatively be employed for the low elasticity layer. For example, organic SOG (elastic modulus: 5 GPa), porous $SiO_2$ (elastic modulus: not more than 70 GPa), gold (elastic modulus: 75 GPa), BCB (divinyl siloxane-bisbenzocyclobutene: elastic modulus: 7 GPa), polyphenylene (elastic modulus: 7 GPa), polyimide resin (elastic modulus: 7 GPa), epoxy resin (elastic modulus: 7 GPa), aluminum (elastic modulus: 70 GPa), white gold (elastic modulus: 80 GPa) or a Ti alloy (elastic modulus: 30 GPa to 80 GPa) may be employed. When the low elasticity layer (SiOC layer) is made of a conductive material, an electrode may be connected to this low elasticity layer.

While the present invention is applied to the microphone (sonic sensor) and the pressure sensor in the aforementioned embodiments respectively, the present invention is not restricted to these but is also applicable to still another sensor such as an acceleration sensor comprising a diaphragm.

What is claimed is:

1. A sensor comprising:
   an electrode plate; and
   a diaphragm, opposed to said electrode plate, including:
   a first elastic film arranged on a central portion, and
   a second elastic film, arranged at least on a peripheral portion of said first elastic film, made of a material having a lower elastic modulus than said first elastic film.

2. The sensor according to claim 1, wherein
   said second elastic film is partially so modified as to reduce residual stress.

3. The sensor according to claim 2, wherein
   said second elastic film is so modified as to substantially eliminate residual stress.

4. The sensor according to claim 2, wherein
   said second elastic film is modified by ion implantation.

5. The sensor according to claim 2, wherein
   said second elastic film includes an unmodified layer and a modified layer formed on said unmodified layer.

6. The sensor according to claim 5, wherein
   said unmodified layer of said second elastic film has tensile stress, and said modified layer of said second elastic film has compressive stress.

7. The sensor according to claim 6, wherein
   said unmodified layer and said modified layer constituting said second elastic film include SiOC layers.

8. The sensor according to claim 1, wherein
   said second elastic film is so formed as to enclose the outer periphery of said first elastic film.

9. The sensor according to claim 1, wherein
   said second elastic film and said first elastic film are stacked with each other.

10. The sensor according to claim 1, further comprising a substrate having an opening, wherein
    said diaphragm is set on a region corresponding to said opening of said substrate.

11. The sensor according to claim 1, wherein said first elastic film is conductive.

12. The sensor according to claim 11, further comprising a first connecting wire portion integrally formed on said first elastic film to extend outward from said diaphragm.

13. The sensor according to claim 12, further comprising a first electrode electrically connected to said first connecting wire portion on the outside of said diaphragm.

14. The sensor according to claim 1, further comprising a second connecting wire portion integrally formed on said electrode plate to extend toward a region corresponding to the outside of said diaphragm.

15. The sensor according to claim 14, further comprising a second electrode electrically connected to said second connecting wire portion on said region corresponding to the outside of said diaphragm.

16. The sensor according to claim 1, wherein
    said sensor is a sonic sensor, and
    a plurality of holes are provided on a region of said electrode plate opposite to said diaphragm.

17. The sensor according to claim 16, further comprising a protective film so formed as to cover said electrode plate and the inner surfaces of said holes, wherein
    a plurality of sonic holes are provided on regions of said protective film corresponding to said holes of said electrode plate.

18. The sensor according to claim 1, being a pressure sensor further comprising:

a first substrate having an opening so that said diaphragm is set on a region corresponding to said opening, and a second substrate opposed to said first substrate so that said electrode plate is set thereon.

19. The sensor according to claim 18, wherein said first substrate includes a recess portion constituting a sensor gap of said pressure sensor.

20. The sensor according to claim 18, wherein said first substrate is a semiconductor substrate, and said second substrate is a glass substrate.

* * * * *